(12) United States Patent
Li et al.

(10) Patent No.: US 9,712,441 B2
(45) Date of Patent: Jul. 18, 2017

(54) METHOD, APPARATUS AND SYSTEM FOR DETERMINING TRANSMISSION PATH OF PACKET

(71) Applicant: Huawei Technologies Co., Ltd., Shenzhen (CN)

(72) Inventors: Ying Li, Beijing (CN); Zhengquan Huang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 140 days.

(21) Appl. No.: 14/743,007

(22) Filed: Jun. 18, 2015

(65) Prior Publication Data
US 2015/0372909 A1    Dec. 24, 2015

(30) Foreign Application Priority Data

Jun. 23, 2014   (CN) .......................... 2014 1 0284262

(51) Int. Cl.
| | | |
|---|---|---|
| *H04L 12/28* | (2006.01) | |
| *H04L 12/741* | (2013.01) | |
| *H04L 12/26* | (2006.01) | |
| *H04L 12/715* | (2013.01) | |
| *H04L 12/751* | (2013.01) | |

(Continued)

(52) U.S. Cl.
CPC .............. *H04L 45/74* (2013.01); *H04L 43/00* (2013.01); *H04L 43/0852* (2013.01); *H04L 43/10* (2013.01); *H04L 45/02* (2013.01); *H04L 45/42* (2013.01); *H04L 45/64* (2013.01); *H04L 47/286* (2013.01); *H04L 45/38* (2013.01)

(58) Field of Classification Search
CPC . H04L 12/28; H04L 12/2852; H04L 12/2854; H04L 12/5696

USPC ............................ 370/351, 389, 395.72, 422
See application file for complete search history.

(56) References Cited

U.S. PATENT DOCUMENTS

| | | | | |
|---|---|---|---|---|
| 7,372,819 B2* | 5/2008 | Martin | ................... | H04L 45/12 370/252 |
| 7,760,735 B1* | 7/2010 | Chen | ....................... | H04L 41/12 370/245 |

(Continued)

FOREIGN PATENT DOCUMENTS

| | | |
|---|---|---|
| EP | 2819356 A1 | 12/2014 |
| WO | 2013184846 A1 | 12/2013 |

OTHER PUBLICATIONS

Foreign Communication From A Counterpart Application, European Application No. 15173346.6, Extended European Search Report dated Oct. 23, 2015, 6 pages.

*Primary Examiner* — Dmitry H Levitan
(74) *Attorney, Agent, or Firm* — Conley Rose, P.C.

(57) ABSTRACT

A method, an apparatus and a system are provided, which relate to the communications field, for determining a transmission path of a packet, and can solve a problem that a determined transmission path of a packet is not accurate enough. The method includes determining, by a network device, a packet; acquiring, by the network device, a characteristic of the packet and an attribute of the packet according to the packet; and sending, by the network device, the characteristic of the packet, the attribute of the packet, and an attribute of the network device to a control device, so that the control device determines a transmission path of the packet according to the characteristic of the packet, the attribute of the packet, and the attribute of the network device.

13 Claims, 9 Drawing Sheets

A control device acquires multiple entries that are sent by multiple network devices and are of a packet, where characteristics of the packet in the multiple entries are the same or the characteristics of the packet in the multiple entries are corresponding, and each entry of the multiple entries includes a characteristic of the packet, an attribute of the packet when a network device that sends the entry receives the packet, and an attribute of the network device that sends the entry ⟵ S201

↓

The control device determines a transmission path of the packet according to multiple attributes of the packet when the multiple network devices receive the packet, and attributes of the multiple network devices in the multiple entries ⟵ S202

(51) Int. Cl.
*H04L 12/841* (2013.01)
*H04L 12/717* (2013.01)
*H04L 12/721* (2013.01)

(56) References Cited

U.S. PATENT DOCUMENTS

| | | | | |
|---|---|---|---|---|
| 8,750,288 | B2* | 6/2014 | Nakil | G06N 99/005 370/351 |
| 9,344,349 | B2* | 5/2016 | Ganichev | H04L 45/586 |
| 2004/0085906 | A1* | 5/2004 | Ohtani | G06F 21/552 370/248 |
| 2014/0301203 | A1* | 10/2014 | Kampmann | H04L 47/10 370/235 |
| 2015/0009827 | A1* | 1/2015 | Kawai | H04L 45/64 370/235 |
| 2015/0334001 | A1* | 11/2015 | Sato | H04L 12/6418 370/392 |

* cited by examiner

METHOD, APPARATUS AND SYSTEM FOR DETERMINING TRANSMISSION PATH OF PACKET

CROSS-REFERENCE TO RELATED APPLICATION

This application claims priority to Chinese Patent Application No. 201410284262.5, filed on Jun. 23, 2014, which is hereby incorporated by reference in its entirety.

TECHNICAL FIELD

This application relates to the communications field, and in particular, to a method, apparatus and system for determining a transmission path of a packet.

BACKGROUND

In a network, a transmission path of a packet in a service flow is generally determined by means of mutual negotiation by network devices in the network and routing by the network devices themselves. Therefore, a network administrator is unaware of an actual transmission path of the packet. In a process of monitoring a packet, when a device that transmits the packet is faulty, an actual transmission path of the packet needs to be determined first, and then a faulty transmission path or device can be located accurately.

Generally, a transmission path of a packet is usually determined by sending a simulated packet. A source device may send a packet that carries Time To Live (TTL), that is, an Internet Control Message Protocol (ICMP) packet. After receiving the ICMP packet, a device on a transmission path subtracts 1 from the TTL in the ICMP packet. If the TTL in the ICMP packet is 0 after 1 is subtracted from the TTL, the device discards the ICMP packet and returns an ICMP Time Exceeded message to the source device; or, if the TTL in the ICMP packet is not 0 after 1 is subtracted from the TTL, the device forwards the ICMP packet. After the source device receives the ICMP Time Exceeded message, the source device learns that the device which sends the ICMP Time Exceeded message exists on the transmission path of the packet. The source device may determine different devices on the transmission path of the packet by sending simulated packets that carry different TTL, and further obtain the transmission path that includes the different devices and is of the packet.

However, in the foregoing method for determining a transmission path of a packet, because an ICMP packet sent by the source device is a simulated packet, a case may occur in which a transmission path of the simulated packet is different from an actual transmission path of the packet, causing that the transmission path that is determined by the source device and is of the packet is not accurate enough. In addition, a large quantity of simulated packets sent by the source device occupy a large amount of network bandwidth, which affects normal packet transmission.

SUMMARY

Embodiments of the present invention provide a method, an apparatus and a system for determining a transmission path of a packet, which can solve a problem that a determined transmission path of a packet is not accurate enough and that the determining of the transmission path of the packet affects normal packet transmission due to occupation of a large amount of network bandwidth.

To fulfill the foregoing objective, embodiments of the present invention uses the following technical solutions.

According to a first aspect, an embodiment of the present invention provides a method for determining a transmission path of a packet, including determining, by a network device, a packet; acquiring, by the network device, a characteristic of the packet and an attribute of the packet according to the packet; and sending, by the network device, the characteristic of the packet, the attribute of the packet, and an attribute of the network device to a control device, so that the control device determines a transmission path of the packet according to the characteristic of the packet, the attribute of the packet, and the attribute of the network device.

In a first possible implementation manner of the first aspect, the network device is a layer-2 network device, the characteristic of the packet includes a layer-3 identifier of the packet, and the attribute of the packet includes TTL of the packet and time of arrival of the packet at the layer-2 network device; or, the characteristic of the packet includes a layer-2 identifier of the packet, and the attribute of the packet includes TTL of the packet and time of arrival of the packet at the layer-2 network device.

With reference to the first aspect or the first possible implementation manner of the first aspect, in a second possible implementation manner of the first aspect, the network device is a layer-3 network device, the characteristic of the packet includes a layer-3 identifier of the packet, and the attribute of the packet includes TTL of the packet.

With reference to the second possible implementation manner of the first aspect, in a third possible implementation manner of the first aspect, the network device is a gateway device, and the method further includes determining, by the gateway device, whether the packet includes a layer-2 identifier of the packet; if the packet includes the layer-2 identifier of the packet, sending, by the gateway device to the control device, the layer-2 identifier of the packet, the layer-3 identifier of the packet, a mapping between the layer-2 identifier of the packet and the layer-3 identifier of the packet, and an Internet Protocol (IP) address of the gateway device, and removing the layer-2 identifier of the packet from the packet; and if the packet does not include the layer-2 identifier of the packet, adding, by the gateway device, the layer-2 identifier of the packet into the packet, and sending, to the control device, the layer-2 identifier of the packet, the layer-3 identifier of the packet, a mapping between the layer-2 identifier of the packet and the layer-3 identifier of the packet, and an IP address of the gateway device.

With reference to the second possible implementation manner of the first aspect, in a fourth possible implementation manner of the first aspect, the network device is a gateway device, and the method further includes determining, by the gateway device, whether the packet includes a layer-2 identifier of the packet; if the packet includes the layer-2 identifier of the packet, removing, by the gateway device, the layer-2 identifier of the packet from the packet, where a value of the layer-2 identifier of the packet is the same as a value of the layer-3 identifier of the packet; or if the packet does not include the layer-2 identifier of the packet, adding, by the gateway device, the layer-2 identifier of the packet into the packet, where a value of the layer-2 identifier of the packet is the same as a value of the layer-3 identifier of the packet.

With reference to the first aspect or any implementation manner of the first possible implementation manner to the fourth possible implementation manner of the first aspect, in a fifth possible implementation manner of the first aspect, before the network device determines the packet, the method further includes acquiring, by the network device, a description that is sent by the control device and is of the packet; and the determining, by a network device, a packet includes comparing, by the network device, the description of the packet with a packet received by the network device; and if the packet received by the network device matches the description of the packet, determining, by the network device, that the packet received by the network device is the packet.

With reference to the first aspect or any implementation manner of the first possible implementation manner to the fifth possible implementation manner of the first aspect, in a sixth possible implementation manner of the first aspect, the packet includes a color bit of the packet, where the color bit of the packet is used to indicate whether the packet is colored, and the determining, by a network device, a packet includes determining, by the network device, a color bit of a packet received by the network device; and if the color bit of the packet received by the network device indicates that the packet received by the network device is colored, determining, by the network device, that the packet received by the network device is the packet.

According to a second aspect, an embodiment of the present invention provides a method for determining a transmission path of a packet, including acquiring, by a control device, multiple entries that are sent by multiple network devices and are of a packet, where characteristics of the packet in the multiple entries are the same or the characteristics of the packet in the multiple entries are corresponding to each other, and each entry of the multiple entries includes a characteristic of the packet, an attribute of the packet when a network device that sends the entry receives the packet, and an attribute of the network device that sends the entry; and determining, by the control device, a transmission path of the packet according to multiple attributes of the packet when the multiple network devices receive the packet, and attributes of the multiple network devices in the multiple entries.

In a first possible implementation manner of the second aspect, the multiple network devices include a layer-2 network device, a characteristic of the packet in an entry sent by the layer-2 network device includes a layer-3 identifier of the packet, and an attribute of the packet in the entry sent by the layer-2 network device includes TTL of the packet received by the layer-2 network device and time of arrival of the packet at the layer-2 network device; or, a characteristic of the packet in an entry sent by the layer-2 network device includes a layer-2 identifier of the packet, and an attribute of the packet in the entry sent by the layer-2 network device includes TTL of the packet received by the layer-2 network device and time of arrival of the packet at the layer-2 network device.

With reference to the first possible implementation manner of the second aspect, in a second possible implementation manner of the second aspect, the multiple network devices include a layer-3 network device, a characteristic of the packet in an entry sent by the layer-3 network device includes the layer-3 identifier of the packet, and an attribute of the packet in the entry sent by the layer-3 network device includes TTL of a packet received by the layer-3 network device.

With reference to the second possible implementation manner of the second aspect, in a third possible implementation manner of the second aspect, the determining, by the control device, a transmission path of the packet according to multiple attributes of the packet when the multiple network devices receive the packet, and attributes of the multiple network devices in the multiple entries includes sorting, by the control device, the multiple entries according to the TTL of the packet and the time of arrival of the packet at the layer-2 network device; and determining, by the control device, that the attributes of the multiple network devices in the sorted multiple entries are the transmission path of the packet.

With reference to the second possible implementation manner of the second aspect, in a fourth possible implementation manner of the second aspect, the network device is a gateway device, and the method further includes acquiring, by the control device, the layer-2 identifier of the packet, the layer-3 identifier of the packet, a mapping between the layer-2 identifier of the packet and the layer-3 identifier of the packet, and an Internet Protocol (IP) address of the gateway device that are sent by the gateway device. With reference to the fourth possible implementation manner of the second aspect, in a fifth possible implementation manner of the second aspect, the multiple entries include entries that have a same value of the layer-2 identifier of the packet and entries that have a same value of the layer-3 identifier of the packet, where the layer-2 identifier of the packet is mapped to the layer-3 identifier of the packet according to the mapping.

According to a third aspect, an embodiment of the present invention provides a network device, including a determining unit configured to determine a packet; an acquiring unit configured to acquire a characteristic of the packet and an attribute of the packet according to the packet determined by the determining unit; and a sending unit configured to send the characteristic of the packet and the attribute of the packet that are acquired by the acquiring unit, and an attribute of the network device to a control device, so that the control device determines a transmission path of the packet according to the characteristic of the packet, the attribute of the packet, and the attribute of the network device.

In a first possible implementation manner of the third aspect, the network device is a layer-2 network device, the characteristic that is acquired by the acquiring unit and is of the packet includes a layer-3 identifier of the packet, and the attribute that is acquired by the acquiring unit and is of the packet includes TTL of the packet and time of arrival of the packet at the layer-2 network device; or, the characteristic that is acquired by the acquiring unit and is of the packet includes a layer-2 identifier of the packet, and the attribute that is acquired by the acquiring unit and is of the packet includes TTL of the packet and time of arrival of the packet at the layer-2 network device.

With reference to the third aspect or the first possible implementation manner of the third aspect, in a second possible implementation manner of the third aspect, the network device is a layer-3 network device, the characteristic that is acquired by the acquiring unit and is of the packet includes a layer-3 identifier of the packet, and the attribute that is acquired by the acquiring unit and is of the packet includes TTL of the packet.

With reference to the second possible implementation manner of the third aspect, in a third possible implementation manner of the third aspect, the network device is a gateway device, and the gateway device further includes a processing unit; the determining unit is further configured to determine whether the packet includes a layer-2 identifier of the packet; the sending unit is further configured to, if the determining unit determines that the packet includes the layer-2 identifier of the packet, send the layer-2 identifier of the packet, the layer-3 identifier of the packet, a mapping between the layer-2 identifier of the packet and the layer-3 identifier of the packet, and an IP address of the gateway device to the control device, and the processing unit is configured to remove the layer-2 identifier of the packet from the packet determined by the determining unit; and the processing unit is further configured to, if the determining unit determines that the packet does not include the layer-2 identifier of the packet, add the layer-2 identifier of the packet into the packet, and the sending unit is further configured to send the layer-2 identifier of the packet, the layer-3 identifier of the packet, the mapping between the layer-2 identifier of the packet and the layer-3 identifier of the packet, and the IP address of the gateway device to the control device.

With reference to the second possible implementation manner of the third aspect, in a fourth possible implementation manner of the third aspect, the network device is a gateway device, and the gateway device further includes a processing unit; the determining unit is further configured to determine whether the packet includes a layer-2 identifier of the packet; and the processing unit is configured to, if the determining unit determines that the packet includes the layer-2 identifier of the packet, remove the layer-2 identifier of the packet from the packet, and if the determining unit determines that the packet does not include the layer-2 identifier of the packet, add the layer-2 identifier of the packet into the packet, where a value of the layer-2 identifier of the packet is the same as a value of the layer-3 identifier of the packet.

With reference to the third aspect or any implementation manner of the first possible implementation manner to the fourth possible implementation manner of the third aspect, in a fifth possible implementation manner of the third aspect, the acquiring unit is further configured to, before the determining unit determines the packet, acquire a description that is sent by the control device and is of the packet; and the determining unit is configured to compare the description that is acquired by the acquiring unit and is of the packet with a received packet; and if the received packet matches the description of the packet, determine that the received packet is the packet.

With reference to the third aspect or any implementation manner of the first possible implementation manner to the fifth possible implementation manner of the third aspect, in a sixth possible implementation manner of the third aspect, the packet determined by the determining unit includes a color bit of the packet, where the color bit of the packet is used to indicate whether the packet is colored, and the determining unit is configured to determine a color bit of a received packet, and if the color bit of the received packet indicates that the received packet is colored, determine that the received packet is the packet.

According to a fourth aspect, an embodiment of the present invention provides a control device, including an acquiring unit configured to acquire multiple entries that are sent by multiple network devices and are of a packet, where characteristics of the packet in the multiple entries are the same or the characteristics of the packet in the multiple entries are corresponding to each other, and each entry of the multiple entries includes a characteristic of the packet, an attribute of the packet when a network device that sends the entry receives the packet, and an attribute of the network device that sends the entry; and a determining unit configured to determine a transmission path of the packet according to multiple attributes of the packet when the multiple network devices receive the packet, and attributes of the multiple network devices in the multiple entries acquired by the acquiring unit.

In a first possible implementation manner of the fourth aspect, the multiple network devices include a layer-2 network device, a characteristic of the packet in an entry sent by the layer-2 network device includes a layer-3 identifier of the packet, and an attribute of the packet in the entry sent by the layer-2 network device includes TTL of the packet received by the layer-2 network device and time of arrival of the packet at the layer-2 network device; or, a characteristic of the packet in an entry sent by the layer-2 network device includes a layer-2 identifier of the packet, and an attribute of the packet in the entry sent by the layer-2 network device includes TTL of the packet received by the layer-2 network device and time of arrival of the packet at the layer-2 network device.

With reference to the first possible implementation manner of the fourth aspect, in a second possible implementation manner of the fourth aspect, the multiple network devices include a layer-3 network device, a characteristic of the packet in an entry sent by the layer-3 network device includes the layer-3 identifier of the packet, and an attribute of the packet in the entry sent by the layer-3 network device includes TTL of a packet received by the layer-3 network device.

With reference to the second possible implementation manner of the fourth aspect, in a third possible implementation manner of the fourth aspect, the determining unit is configured to sort the multiple entries according to the TTL of the packet and the time of arrival of the packet at the layer-2 network device; and determine that the attributes of the multiple network devices in the sorted multiple entries are the transmission path of the packet.

With reference to the second possible implementation manner of the fourth aspect, in a fourth possible implementation manner of the fourth aspect, the network device is a gateway device, and the acquiring unit is further configured to acquire the layer-2 identifier of the packet, the layer-3 identifier of the packet, a mapping between the layer-2 identifier of the packet and the layer-3 identifier of the packet, and an IP address of the gateway device that are sent by the gateway device.

With reference to the fourth possible implementation manner of the fourth aspect, in a fifth possible implementation manner of the fourth aspect, the multiple entries acquired by the acquiring unit include entries that have a same value of the layer-2 identifier of the packet and entries that have a same value of the layer-3 identifier of the packet, where the layer-2 identifier of the packet is mapped to the layer-3 identifier of the packet according to the mapping.

According to a fifth aspect, an embodiment of the present invention provides a system for determining a transmission path of a packet, including multiple network devices according to the third aspect and the control device according to the fourth aspect.

The embodiments of present invention provides a method, an apparatus, and a system for determining a transmission path of a packet, where a network device determines a packet, and the network device acquires a characteristic of the packet and an attribute of the packet according to the packet; the network device sends the characteristic of the packet, the attribute of the packet, and an attribute of the network device to a control device; and the control device determines a transmission path of the packet according to the characteristic of the packet, the attribute of the packet, and the attribute of the network device. According to this solution, because the network device may send, to the control device, the characteristic of the packet that actually flows through the network device, the attribute of the packet, and the attribute of the network device, the control device can determine a transmission path of the packet that actually flows through the network device, that is, an actual transmission path of the packet, according to the characteristic of the packet that actually flows through the network device, the attribute of the packet, and the attribute of the network device. Therefore, a problem that a determined transmission path of a packet is generally not accurate enough and that the determining of a transmission path of a packet affects normal packet transmission due to occupation of a large amount of network bandwidth is solved, the transmission path of the packet can be determined accurately, and the determining of a transmission path of a packet does not affect normal packet transmission.

DESCRIPTION OF EMBODIMENTS

In a method for determining a transmission path of a packet provided by embodiments of the present invention, a control device and a network device in a network may determine a transmission path of a packet accurately in real time according to packets that actually flow through the network device, so as to obtain a transmission path of a service flow including multiple packets.

The following describes in detail, with reference to the accompanying drawings, a method, an apparatus and a system for determining a transmission path of a packet provided by the embodiments of the present invention.

Embodiment 1

Figure 1:
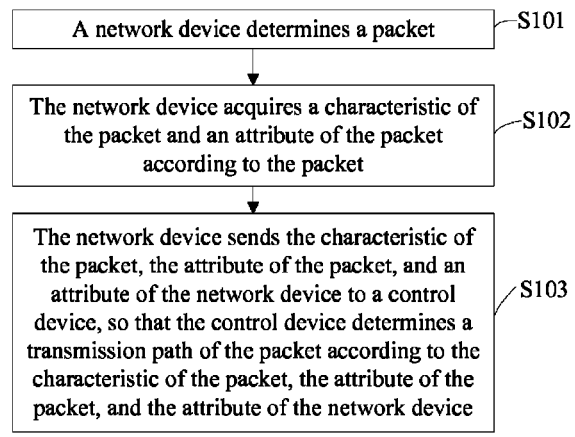
FIG. 1 is flowchart 1 of a method for determining a transmission path of a packet according to an embodiment of the present invention.

This embodiment of the present invention provides a method for determining a transmission path of a packet. As shown in FIG. 1, the method may include the following.

S101. A network device determines a packet.

In the method for determining a transmission path of a packet provided in this embodiment of the present invention, if a control device needs to determine a transmission path of a packet in a network, the control device sends a description of the packet to a network device in a detection area manageable by the control device. The detection area manageable by the control device may be defined as an area covering all network devices reachable by routes of the control device. If the control device needs to determine transmission paths of multiple groups of packets in the network, the control device may send multiple descriptions to the network devices in the detection area manageable by the control device, and number each description. Alternatively, the step of sending the description of the packet by the control device may be omitted. In this scenario, the network device uses all received packets as packets whose transmission paths need to be determined. That is, in a subsequent step 102, the network device acquires a characteristic and an attribute of each packet of all received packets.

The control device provided in the embodiment of the present invention may be a network management device or a controller or the like. The network device provided in the embodiment of the present invention may be a network switch or a router or the like.

Methods of determining a transmission path of a packet by all network devices in the network are similar. The embodiment of the present invention uses one network device of all network devices as an example to give an exemplary description.

After the network device in the network acquires a description that is sent by the control device and is of a packet, the network device may determine, according to the description of the packet, a packet matching the description of the packet in packets that actually flow through the network device. The description of the packet may be used to uniquely identify a service flow that includes the packet. That is, descriptions of service flows received by the network device (one service flow includes multiple packets, that is, multiple packets in a same service flow have a same description) are different from each other.

The description of the packet may include one or more of a source IP address of the packet, a destination IP address of the packet, a protocol port number of the packet, and a differentiated service code point (DSCP) of the packet.

The foregoing several types of descriptions of the packet are merely exemplary, and any description that can be used to uniquely identify a service flow falls within the protection scope of the present invention.

Optionally, the network device may use an access control list (ACL) to determine the packet matching the description of the packet. In the embodiment of the present invention, the description of the packet may be set as an ACL entry used to determine the packet matching the description of the packet.

S102. The network device acquires a characteristic of the packet and an attribute of the packet according to the packet.

After the network device determines the packet, the network device may acquire the characteristic of the packet and the attribute of the packet according to the packet. The characteristic of the packet refers to one or more fields that are capable of identifying the packet and are in the packet. On the transmission path of the packet, the one or more fields keep unchanged, or changes in a determinable manner, that is, the characteristic of the packet after the change corresponds to the characteristic of the packet before the change. For example, after network address translation (NAT), the source IP address of the packet may change, but it may be determined by a NAT device that the source IP address before the change is corresponding to the source IP address after the change. The NAT device may send a correspondence between the IP address before the NAT and the IP address after the NAT to the control device, so that the control device determines that characteristics of the packet are corresponding to each other. The attribute of the packet refers to an attribute that may be used to indicate the transmission path of the packet, such as TTL of the packet or time of arrival of the packet at the network device. The attribute of the packet keeps changing on the transmission path of the packet or changes on at least a part of the transmission path of the packet.

The network device provided in the embodiment of the present invention may be a layer-2 network device or a layer-3 network device. The layer-2 network device is a network device that works at a data link layer, such as a layer-2 network switch; and the layer-3 network device is a network device that works at a network layer, such as a router or a layer-3 network switch.

When the network device is a layer-2 network device, the characteristic of the packet may include a layer-3 identifier of the packet, and the attribute of the packet may include TTL of the packet and time of arrival of the packet at the layer-2 network device; or, the characteristic of the packet may include a layer-2 identifier of the packet, and the attribute of the packet may include TTL of the packet and time of arrival of the packet at the layer-2 network device. The layer-3 identifier of the packet may be used to identify the packet, and the TTL of the packet may be used to represent the number of hops that the packet is forwarded.

The layer-3 identifier of the packet is an Identification field in an IP header of the packet. Further, in a scenario in which the packet is fragmented, because Identification fields of several packets generated by the fragmentation are the same, a combination of the Identification field in the IP header and a Fragment Offset field in the IP header, or a combination of the Identification field in the IP header, a Flag field in the IP header, and the Fragment Offset field in the IP header, may be used as the layer-3 identifier of the packet.

In a possible implementation manner of the embodiment of the present invention, a layer-2 header of the packet is a common Ethernet header. If the layer-2 network device is a layer-3 network switch that works at the data link layer and is capable of parsing a layer-3 header of the packet, after the layer-2 network device determines the packet, the layer-2 network device may parse the layer-3 header of the packet to acquire the layer-3 identifier of the packet and the TTL of the packet, use the layer-3 identifier of the packet as the characteristic of the packet, and use the TTL of the packet as the attribute of the packet. If the layer-2 network device is a layer-2 network switch and is incapable of parsing the layer-3 header of the packet, and the layer-3 identifier and an offset value of the TTL relative to the layer-2 header are preset in the layer-2 network device. After the layer-2 network device determines the packet, the layer-2 network device may read data in a fixed position after the layer-2 header according to the preset offset value after parsing the layer-2 header of the packet, use the data as the layer-3 identifier of the packet and the TTL of the packet, use the layer-3 identifier of the packet as the characteristic of the packet, and use the TTL of the packet as the attribute of the packet.

In another possible implementation manner of the embodiment of the present invention, the layer-2 header of the packet includes an extension field that is used as the layer-2 identifier of the packet. If the layer-2 network device is a layer-3 network switch that works at the data link layer and is capable of parsing a layer-2 header and a layer-3 header of the packet, after the layer-2 network device determines the packet, the layer-2 network device may parse the layer-2 header of the packet to acquire the layer-2 identifier of the packet, parse the layer-3 header of the packet to acquire the TTL of the packet, use the layer-2 identifier of the packet as the characteristic of the packet, and use the TTL of the packet as the attribute of the packet. If the layer-2 network device is a layer-2 network switch and is incapable of parsing the layer-3 header of the packet, an offset value of the TTL relative to the layer-2 header is preset in the layer-2 network device. After the layer-2 network device determines the packet, the layer-2 network device may acquire the layer-2 identifier of the packet after parsing the layer-2 header of the packet, read data in a fixed position after the layer-2 header according to the preset offset value, use the data as the TTL of the packet, use the layer-2 identifier of the packet as the characteristic of the packet, and use the TTL of the packet as the attribute of the packet.

Exemplarily, the length of an extension field in the layer-2 header of the packet is 4 bytes, of which the first 16 bits are used to represent a type declaration, and the other 16 bits are used to represent the layer-2 identifier of the packet.

Further, when the layer-2 header of the packet includes an extension field, a gateway device may add the layer-2 identifier of the packet into the extension field for the packet. For a specific process, reference may be made to descriptions about FIG. 4 and FIG. 5 in the following Embodiment 2.

When the network device is a layer-3 network device, the characteristic of the packet may include a layer-3 identifier of the packet, and the attribute of the packet may include TTL of the packet. The layer-3 identifier of the packet is an Identification field in an IP header. Further, in a scenario in which the packet is fragmented, a combination of the Identification field in the IP header and a Fragment Offset field in the IP header, or a combination of the Identification field in the IP header, a Flags field in the IP header, and the Fragment Offset field in the IP header, may be used as the layer-3 identifier of the packet.

The characteristic of the packet further includes a source IP address of the packet, or a source IP address of the packet and a destination IP address of the packet. If the description that is sent by the control device and is of the packet includes the source IP address or includes a combination of the source IP address and the destination IP address, a number of the description that is sent by the control device and is of the packet may be used to replace the source IP address or the combination of the source IP address and the destination IP address in the characteristic of the packet. That the characteristic of the packet includes the Identification field in the IP header is used as an example. If the description that is sent by the control device to the network device and is of a packet numbered 1 is a protocol port number of the packet, the characteristic of the packet includes the Identification field in the IP header of the packet and the source IP address of the packet; if the description that is sent by the control device to the network device and is of a packet numbered 2 is the source IP address of the packet and the destination IP address of the packet, the characteristic of the packet includes the Identification field in the IP header of the packet and a number, which is 2, of a description of the packet.

Further, the time of arrival that is in the attribute of the packet and is of the packet at the layer-2 network device may be determined by the layer-2 network device according to time of reception of the packet by the layer-2 network device.

S103. The network device sends the characteristic of the packet, the attribute of the packet, and an attribute of the network device to a control device, so that the control device determines a transmission path of the packet according to the characteristic of the packet, the attribute of the packet, and the attribute of the network device.

After the network device acquires the characteristic of the packet and the attribute of the packet, the network device may send the characteristic of the packet, the attribute of the packet, and the attribute of the network device to the control device, so that the control device determines the transmission path of the packet according to the characteristic of the packet, the attribute of the packet, and the attribute of the network device.

The attribute of the network device may include at least one of an IP address of the network device, a media access control (MAC) address of the network device, and a serial number allocated by a network management device to the network device.

Optionally, the attribute of the network device may further include at least one of a port number used by the network device to receive the packet, and a port number used by the network device to send the packet.

The method used by other network devices in the network to determine a transmission path of a packet is similar to the foregoing method used by the network device to determine a transmission path of a packet, and is not further described here.

Figure 2:
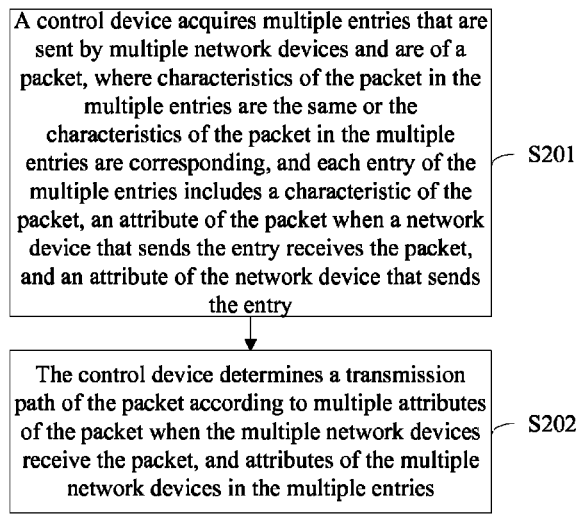
FIG. 2 is flowchart 2 of a method for determining a transmission path of a packet according to an embodiment of the present invention.

This embodiment of the present invention provides a method for determining a transmission path of a packet. As shown in FIG. 2, the method may include the following.

S201. A control device acquires multiple entries that are sent by multiple network devices and are of a packet, where characteristics of the packet in the multiple entries are the same or the characteristics of the packet in the multiple entries are corresponding to each other, and each entry of the multiple entries includes a characteristic of the packet, an attribute of the packet that the packet has when a network device that sends the entry receives the packet, and an attribute of the network device that sends the entry.

In a detection area manageable by the control device, the control device may receive multiple entries that are sent by network devices in the area and are of multiple packets, where each packet corresponds to multiple entries. According to the characteristic of a packet in an entry, the control device may determine a packet to which the entry belongs, that is, may determine, according to the characteristic of the packet, multiple entries that belong to one packet. In the multiple entries that belong to one packet, characteristics of the packet are the same or corresponding to each other. Methods used by the control device to determine transmission paths of all packets of the multiple packets are similar. The embodiment of the present invention uses one packet of multiple packets as an example to give an exemplary description.

The control device acquires multiple entries of one packet from the received multiple entries of the multiple packets, where characteristics of the packet in the multiple entries are the same or the characteristics of the packet in the multiple entries are corresponding to each other, and each entry of the multiple entries includes a characteristic of the packet, an attribute of the packet that the packet has when a network device that sends the entry receives the packet, and an attribute of the network device that sends the corresponding entry.

For the characteristic of the packet, the attribute of the packet, and the attribute of the network device, reference may be made to the related description in S101-S103, and no repeated description is given herein.

S202. The control device determines a transmission path of the packet according to multiple attributes of the packet when the multiple network devices receive the packet, and attributes of the multiple network devices in the multiple entries.

After the control device acquires the multiple entries of the packet, the control device may determine the transmission path of the packet according to the multiple attributes of the packet when the multiple network devices receive the packet, and attributes of the multiple network devices in the multiple entries.

The control device may sort the multiple entries according to TTL of the packet in the multiple entries and time of arrival of the packet at the layer-2 network device in the multiple entries, and determine that the attributes of the multiple network devices in the sorted multiple entries are the transmission path of the packet. For example, the control device may sort the multiple entries for a first time according to the TTL of the packet in the multiple entries, and then sort the multiple entries, which are obtained after the first time of sorting, for a second time according to the time of arrival of the packet at the layer-2 network device in the multiple entries, and finally the control device determines that the attributes of the multiple network devices in the multiple entries sorted for the second time are the transmission path of the packet. The control device may also sort the multiple entries for a first time according to the time of arrival of the packet at the layer-2 network device in the multiple entries, and then sort the multiple entries, which are obtained after the first time of sorting, for a second time according to the TTL of the packet in the multiple entries, and finally the control device determines that the attributes of the multiple network devices in the multiple entries sorted for the second time are the transmission path of the packet. The layer-2 network device does not process a layer-3 header of the packet. Therefore, after the packet is forwarded by the layer-2 network device, the TTL of the packet is the same as the TTL of the packet received by the layer-2 network device. The TTL of the packet in the multiple entries received by the control device and sent by multiple layer-2 network devices may be the same. If multiple entries related to the packet are sorted according to only the TTL, only a sequence of layer-3 network devices that forward the packet can be determined. Therefore, the control device determines, according to the time of arrival of the packet at the layer-2 network device, a sequence of layer-2 network devices that forward the packet, and according to the TTL of the packet, determines the sequence of layer-3 network devices that forward the packet. If the TTL in an entry sent by the layer-2 network device is the same as that in an entry sent by the layer-3 network device, the control device places the entry that is sent by the layer-2 network device in front of the entry sent by the layer-3 network device.

In the method for determining a transmission path of a packet according to an embodiment of the present invention, because a packet that actually flows through a network device is used in determining a transmission path of the packet, in comparison with a conventional method in which a simulated packet is used to determine a transmission path of a packet (the transmission path of the packet may represent a transmission path of a service flow that includes the packet), it is not necessary to learn about a structure of the simulated packet before determining the transmission path of the packet; and it is avoided that simulated packets occupy a large amount of network bandwidth and network device resources; and an actual transmission path of the packet can be determined in real time, and a problem is avoided that the determined transmission path of the packet is not accurate enough due to randomness of routing and forwarding of a network device, so that the transmission path of the packet can be determined conveniently and accurately in real time.

The embodiment of the present invention provides a method for determining a transmission path of a packet, where a network device determines a packet, and the network device acquires a characteristic of the packet and an attribute of the packet according to the packet; the network device sends the characteristic of the packet, the attribute of the packet, and an attribute of the network device to a control device; and the control device determines a transmission path of the packet according to the characteristic of the packet, the attribute of the packet, and the attribute of the network device. According to this solution, because the network device may send, to the control device, the characteristic of the packet that actually flows through the network device, the attribute of the packet, and the attribute of the network device, the control device can determine a transmission path of the packet that actually flows through the network device, that is, an actual transmission path of the packet, according to the characteristic of the packet that actually flows through the network device, the attribute of the packet, and the attribute of the network device. Therefore, a problem that a determined transmission path of a packet is generally not accurate enough and that the determining of a transmission path of a packet affects normal packet transmission due to occupation of a large amount of network bandwidth is solved, the transmission path of the packet can be determined accurately, and the determining of a transmission path of a packet does not affect normal packet transmission.

Embodiment 2

Figure 3:
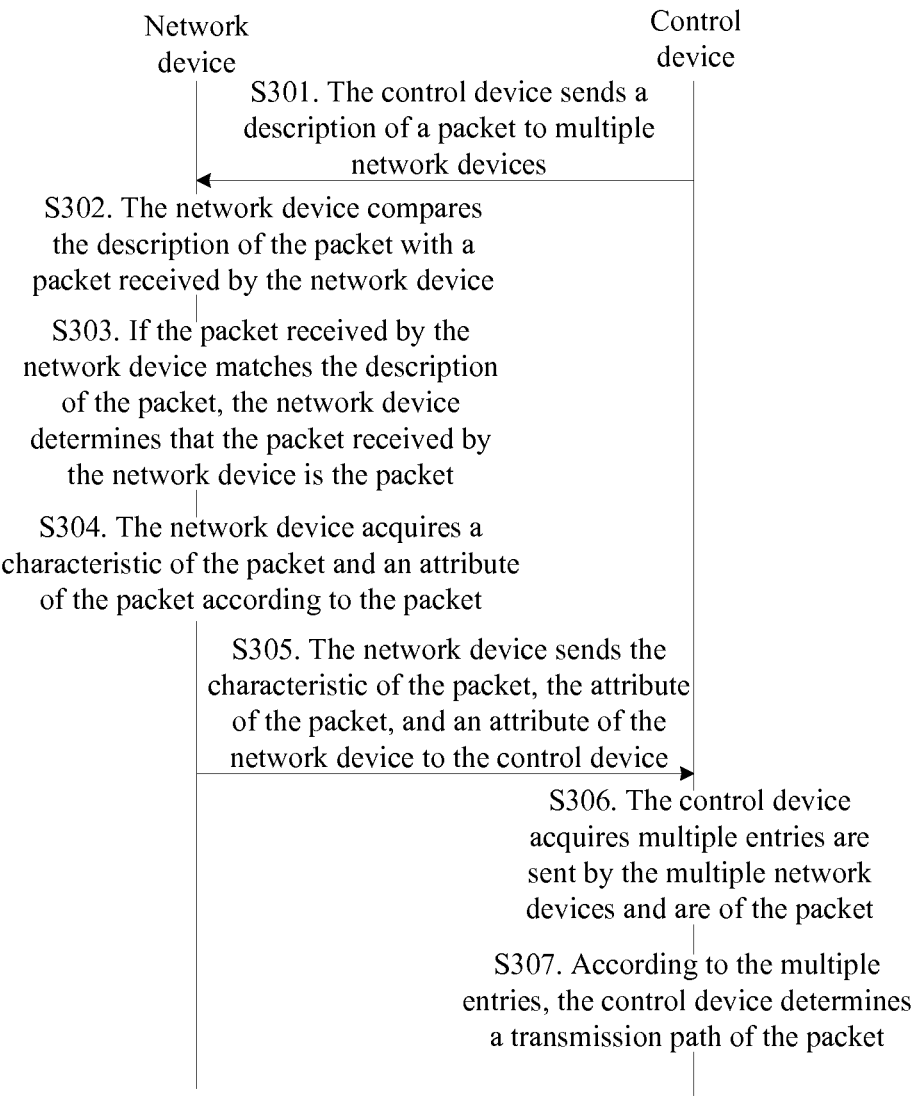
FIG. 3 is interaction diagram 1 of a method for determining a transmission path of a packet according to an embodiment of the present invention.

This embodiment of the present invention provides a method for determining a transmission path of a packet. As shown in FIG. 3, the method may include the following.

S301. A control device sends a description of a packet to multiple network devices.

In the method for determining a transmission path of a packet provided in this embodiment of the present invention, if a control device needs to determine a transmission path of a packet in a network, the control device sends a description of the packet to a network device in a detection area manageable by the control device. The detection area manageable by the control device may be defined as an area covering all network devices reachable by routes of the control device. If the control device needs to determine transmission paths of multiple packets in the network, the control device may send multiple descriptions to the network devices in the detection area manageable by the control device, and number each description. Alternatively, the step of sending the description of the packet by the control device may be omitted. In this scenario, the network device uses all received packets as packets whose transmission paths need to be determined. That is, in a subsequent step 304, the network device acquires a characteristic and an attribute of each packet of all received packets.

The control device provided in the embodiment of the present invention may be a network management device or a controller or the like. The network device provided in the embodiment of the present invention may be a network switch or a router or the like.

The description of the packet may be used to uniquely identify a service flow that includes the packet. That is, descriptions of service flows received by the network device (one service flow includes multiple packets, that is, multiple packets in a same service flow have a same description) are different. The description of the packet may include one or more of a source IP address of the packet, a destination IP address of the packet, a protocol port number of the packet, and a DSCP of the packet.

The several types of descriptions of the packet are merely exemplary, and any description that can be used to uniquely identify a service flow falls within the protection scope of the present invention.

Methods of determining a transmission path of a packet by all network devices in the network are similar. The embodiment of the present invention uses one network device of all network devices as an example to give an exemplary description.

S302. A network device compares the description of the packet with a packet received by the network device.

After the network device acquires the description that is sent by the control device and is of the packet, the network device may compare the description of the packet with a packet received by the network device, where the packet received by the network device includes a description of the packet received by the network device. The network device compares the description of the packet with the description of the packet received by the network device.

S303. If the packet received by the network device matches the description of the packet, the network device determines that the packet received by the network device is the packet.

If the packet received by the network device matches the description that is acquired by the network device and sent by the control device and is of the packet, the network device determines that the packet received by the network device is the packet.

For example, if the description that is sent by the control device and is of the packet is a source IP address of the packet and a destination IP address of the packet, the network device may compare the source IP address of the packet with a source IP address of the packet received by the network device, and compare the destination IP address of the packet with a destination IP address of the packet received by the network device. If the source IP address of the packet is the same as the source IP address of the packet received by the network device and the destination IP address of the packet is the same as the destination IP address of the packet received by the network device, the network device may determine that the packet received by the network device is the packet.

Optionally, the network device may use an ACL to determine the packet matching the description of the packet. In the embodiment of the present invention, the description of the packet may be set as an ACL entry, which is used to determine the packet matching the description of the packet.

S304. The network device acquires a characteristic of the packet and an attribute of the packet according to the packet.

For a description about S304, reference may be made to the related description in S102 above, and no repeated description is given herein.

S305. The network device sends the characteristic of the packet, the attribute of the packet, and an attribute of the network device to the control device.

For a description about S305, reference may be made to the related description in S103 above, and no repeated description is given herein.

When a packet flows through a network device, the network device may determine, according to the method provided in S302-S305, a packet whose transmission path needs to be determined, acquire a characteristic of a packet and the attribute of the packet, and send the characteristic of the packet, the attribute of the packet, and the attribute of the network device to the control device. Finally, multiple network devices that the packet flows through send multiple characteristics of the packet, multiple attributes of the packet when the multiple network devices receive the packet, and attributes of the multiple network devices to the control device. The multiple characteristics of the packet, the multiple attributes of the packet when the multiple network devices receive the packet, and the attributes of the multiple network devices form multiple entries of the packet. The characteristics of the packet in the multiple entries are the same or the characteristics of the packet in the multiple entries are corresponding to each other, and each entry of the multiple entries includes a characteristic of the packet, an attribute of the packet that the packet has when a network device that sends the entry receives the packet, and an attribute of the network device that sends the entry.

S306. The control device acquires multiple entries that are sent by the multiple network devices and are of the packet.

The control device acquires multiple entries that are sent by multiple network devices and are of a packet, where characteristics of the packet in the multiple entries are the same or the characteristics of the packet in the multiple entries are corresponding to each other, and each entry of the multiple entries includes a characteristic of the packet, an attribute of the packet that the packet has when a network device that sends the corresponding entry receives the packet, and an attribute of the network device that sends the corresponding entry.

For a description about S306, reference may be made to the related description in S201 above, and no repeated description is given herein.

S307. According to the multiple entries, the control device determines a transmission path of the packet.

After the control device acquires the multiple entries that are sent by multiple network devices and are of the packet, the control device may determine the transmission path of the packet according to the multiple attributes of the packet when the multiple network devices receive the packet, and attributes of the multiple network devices in the multiple entries.

For a description about S307, reference may be made to the related description in S202 above, and no repeated description is given herein.

Further, in S307, the determining, by the control device, a transmission path of the packet according to multiple attributes of the packet when the multiple network devices receive the packet, and attributes of the multiple network devices in the multiple entries, may include sorting, by the control device, the multiple entries according to the TTL of the packet in the multiple entries and the time of arrival of the packet at the layer-2 network device in the multiple entries, and determining that the attributes of the multiple network devices in the sorted multiple entries are the transmission path of the packet.

For example, the following manner may be used.

(1a) The control device sorts the multiple entries for a first time according to the TTL of the packet in the multiple entries.

(2a) According to the time of arrival of the packet at the layer-2 network device in the multiple entries, the control device sorts the multiple entries that are obtained after the first time of sorting for a second time.

(3a) The control device determines that the attributes of the multiple network devices in the multiple entries sorted for the second time are the transmission path of the packet.

Alternatively, the following manner may be used.

(1b) According to the time of arrival of the packet at the layer-2 network device in the multiple entries, the control device sorts the multiple entries for a first time.

(2b) According to the TTL of the packet in the multiple entries, the control device sorts the multiple entries that are obtained after the first time of sorting for a second time.

(3b) The control device determines that the attributes of the multiple network devices in the multiple entries sorted for the second time are the transmission path of the packet.

Figure 4:
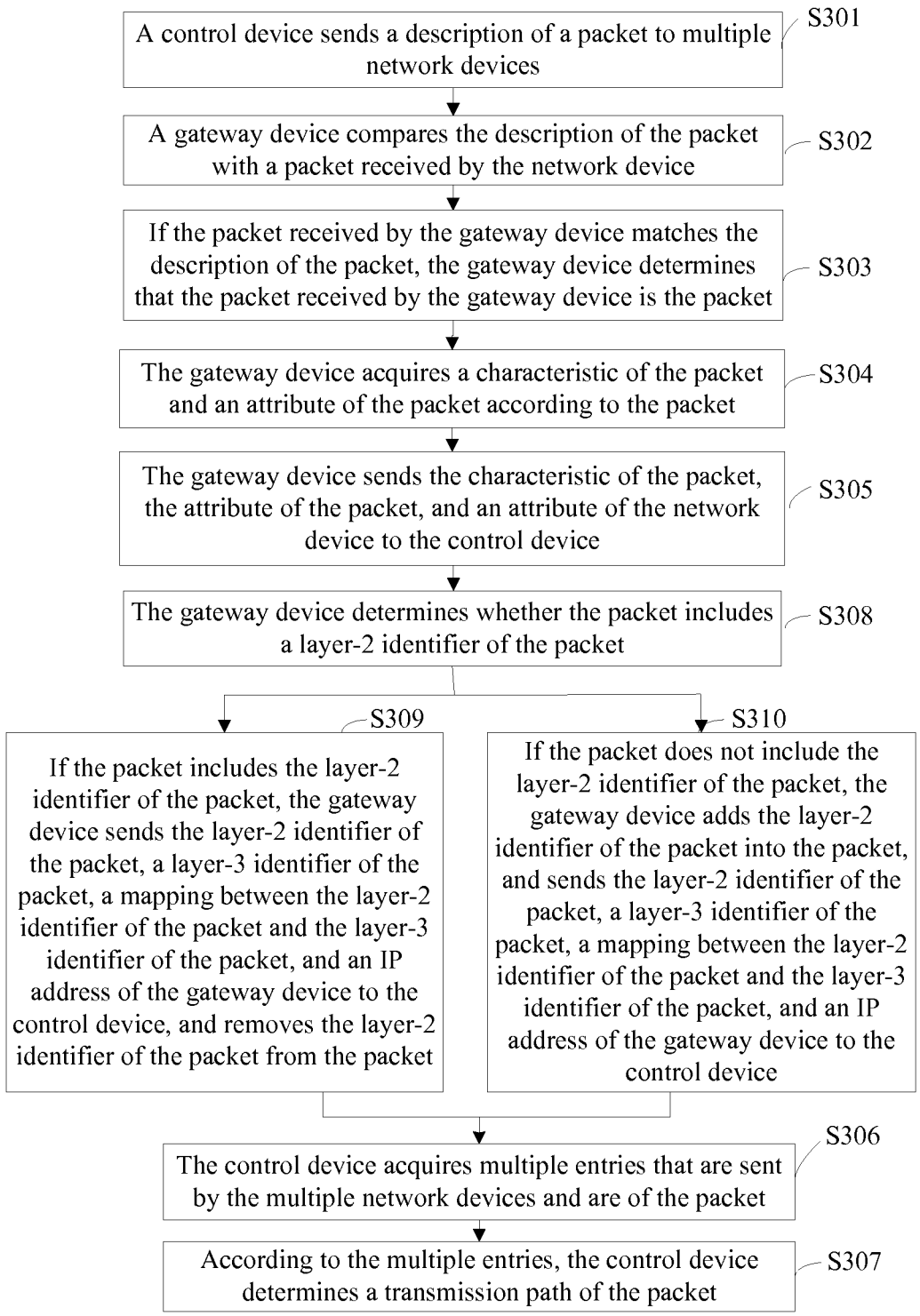
FIG. 4 is flowchart 3 of a method for determining a transmission path of a packet according to an embodiment of the present invention.

Further, as shown in FIG. 4, when the network device is a gateway device, S302-S305 provided in the embodiment of the present invention are all executed by the gateway device, and after S303 and before S306, the method for determining a transmission path of a packet provided in the embodiment of the present invention may further include the following.

S308. A gateway device determines whether the packet includes a layer-2 identifier of the packet.

S309. If the packet includes the layer-2 identifier of the packet, the gateway device sends the layer-2 identifier of the packet, a layer-3 identifier of the packet, a mapping between the layer-2 identifier of the packet and the layer-3 identifier of the packet, and an IP address of the gateway device to the control device, and removes the layer-2 identifier of the packet from the packet.

S310. If the packet does not include the layer-2 identifier of the packet, the gateway device adds the layer-2 identifier of the packet into the packet, and sends the layer-2 identifier of the packet, a layer-3 identifier of the packet, a mapping between the layer-2 identifier of the packet and the layer-3 identifier of the packet, and an IP address of the gateway device to the control device.

After the gateway device determines the packet, the gateway device may determine whether the packet includes a layer-2 identifier of the packet. If the packet includes the layer-2 identifier of the packet, the gateway device sends the layer-2 identifier of the packet, a layer-3 identifier of the packet, a mapping between the layer-2 identifier of the packet and the layer-3 identifier of the packet, and an IP address of the gateway device to the control device, and the gateway device removes the layer-2 identifier of the packet from the packet and forwards the packet. If the packet does not include the layer-2 identifier of the packet, the gateway device allocates a layer-2 identifier to the packet, adds the layer-2 identifier into the packet, and sends the layer-2 identifier of the packet, a layer-3 identifier of the packet, a mapping between the layer-2 identifier of the packet and the layer-3 identifier of the packet, and an IP address of the gateway device to the control device, and the gateway device forwards the packet, where the layer-2 identifier of the packet, which is added by the gateway device into the packet, is mapped to the layer-3 identifier of the packet.

Figure 5:
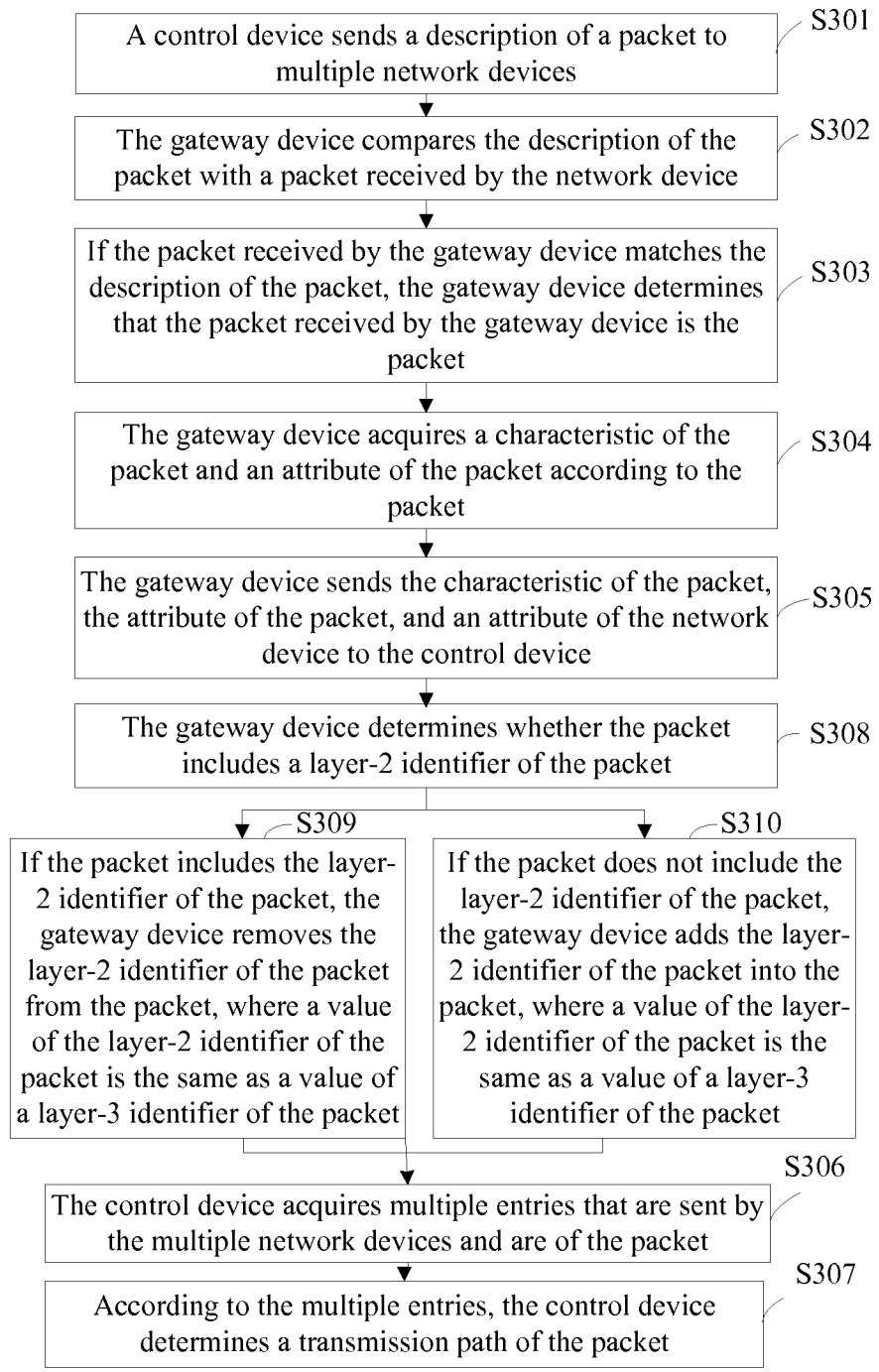
FIG. 5 is flowchart 4 of a method for determining a transmission path of a packet according to an embodiment of the present invention.

The foregoing solution is generally applied to a scenario in which the packet may possibly be fragmented, that is, the layer-3 identifier of the packet is a combination of the Identification field in the IP header and a Fragment Offset field in the IP header, or a combination of the Identification field in the IP header, a Flags field in the IP header, and the Fragment Offset field in the IP header. Therefore, the gateway allocates a dedicated layer-2 identifier to the packet, and sends the layer-2 identifier of the packet, the layer-3 identifier of the packet, and the mapping between the layer-2 identifier of the packet and the layer-3 identifier of the packet to the control device. If the foregoing solution is applied to a scenario in which the packet is not fragmented, the layer-3 identifier of the packet is the Identification field in the IP header. In this scenario, the gateway device may also allocate a dedicated layer-2 identifier to the packet and sends the layer-2 identifier of the packet, the layer-3 identifier of the packet, and the mapping between the layer-2 identifier of the packet and the layer-3 identifier of the packet to the control device. Alternatively, the gateway device may also copy the Identification field in the IP header into the layer-2 identifier of the packet. That is, a value of the layer-2 identifier of the packet is equal to a value of the layer-3 identifier of the packet. As shown in FIG. 5, when the network device is a gateway device, S302-S305 provided in the embodiment of the present invention are all executed by the gateway device, and S308-S310 may also include the following.

S308. A gateway device determines whether the packet includes a layer-2 identifier of the packet.

S309. If the packet includes the layer-2 identifier of the packet, the gateway device removes the layer-2 identifier of the packet from the packet, where a value of the layer-2 identifier of the packet is the same as a value of the layer-3 identifier of the packet.

S310. If the packet does not include the layer-2 identifier of the packet, the gateway device adds the layer-2 identifier of the packet into the packet, where a value of the layer-2 identifier of the packet is the same as a value of the layer-3 identifier of the packet.

In the embodiment of the present invention, the sequence of execution of S304-S305 and S308-S310 is arbitrary. That is, in the embodiment of the present invention, S304-S305 may be executed before S308-S310; or S308-S310 may be executed before S304-S305; or S304-S305 and S308-S310 may be executed simultaneously.

Corresponding to the method shown in FIG. 4, when the control device in S306 acquires multiple entries that are sent by multiple network devices and are of a packet, the control device may first determine, among the entries sent by all network devices in a detection area manageable by the control device, all entries in which the foregoing mapping is satisfied between the layer-2 identifier of the packet and the layer-3 identifier of the packet, that is, the all entries are multiple entries of a same packet, where the determining is performed according to the layer-2 identifier of the packet, the layer-3 identifier of the packet, the mapping between the layer-2 identifier of the packet and the layer-3 identifier of the packet that are sent by the gateway device. In this way, the control device acquires the multiple entries that is sent by the multiple network devices and is of the packet. Exemplarily, the layer-2 identifier of the packet, the layer-3 identifier of the packet, and the mapping between the layer-2 identifier of the packet and the layer-3 identifier of the packet that are sent by the gateway device, may be shown in Table 1.

TABLE 1

| Layer-3 identifier of the packet | Layer-2 identifier of the packet | IP address of the gateway device |
|---|---|---|
| a | e | IP7 |
| a | h | IP9 |

From Table 1, it may be seen that all entries in which the identifier of the packet is "a", "e" or "h" are entries fed back by different network devices after the same packet passes through the different network devices.

Corresponding to the method shown in FIG. 5, when the control device in S306 acquires multiple entries are sent by multiple network devices and are of a packet, the control device may determine, among the entries sent by all network devices in a detection area manageable by the control device, all entries in which the identifier of the packet is the same, which are multiple entries of a same packet. In this way, the control device acquires the multiple entries that are sent by the multiple network devices and are of the packet.

For example, it is assumed that a result of sorting multiple entries is shown in Table 2, where the entries are sorted according to the TTL of a packet in multiple entries and the time of arrival of the packet at the layer-2 network device in the multiple entries after the control device acquires the multiple entries that are sent by multiple network devices and are of the packet; characteristics of the multiple packets include source IP addresses of the multiple packets and identifiers of the multiple packets; and attributes of the multiple network devices are IP addresses of the multiple network devices. Therefore, the control device may acquire, according to Table 2, a sequence of arrival of the packet at the multiple network devices, and may determine the transmission path of the packet according to Table 2, where the transmission path of the packet may consist of IP addresses of the multiple network devices.

Further, the attributes of the multiple network devices may include at least one of IP addresses of the multiple network devices, MAC addresses of the multiple network devices, and serial numbers allocated by a network management device to the multiple network devices.

Optionally, the attributes of the multiple network devices may further include at least one of port numbers used by the multiple network devices to receive the packet, and port numbers used by the multiple network devices to send the packet.

Exemplarily, for details about the attributes of the multiple network devices and the transmission path of the packet, reference may be made to Table 2 and Table 3.

TABLE 2

| Source IP address of the packet | Identifier of the packet | TTL of the packet | IP address of the network device | Time of arrival of the packet at the network device |
|---|---|---|---|---|
| IP10 | a | i | IP1 | t01 |
| IP10 | a | i | IP2 | t02 |
| IP10 | a | i | IP3 | t04 |
| IP10 | a | x | IP7 | t07 |
| IP10 | a | y | IP8 | t10 |
| IP10 | a | z | IP9 | t13 |

TABLE 2-continued

| Source IP address of the packet | Identifier of the packet | TTL of the packet | IP address of the network device | Time of arrival of the packet at the network device |
|---|---|---|---|---|
| IP10 | a | z | IP4 | t14 |
| IP10 | a | q | IP5 | t17 |
| IP10 | a | r | IP6 | t21 |

TABLE 3

| Source IP address of the packet | Identifier of the packet | TTL of the packet | IP address of the network device | Port number used by the network device to receive the packet | Port number used by network device to send the packet | Time of arrival of the packet at the network device |
|---|---|---|---|---|---|---|
| IP10 | e | i | IP1 | Port 1 | Port 13 | t01 |
| IP10 | e | i | IP2 | Port 3 | Port 2 | t02 |
| IP10 | e | i | IP3 | Port 2 | Port 5 | t04 |
| IP10 | a | x | IP7 | Port 5 | Port 2 | t07 |
| IP10 | a | y | IP8 | Port 3 | Port 13 | t10 |
| IP10 | a | z | IP9 | Port 1 | Port 4 | t13 |
| IP10 | h | z | IP4 | Port 11 | Port 7 | t14 |
| IP10 | h | q | IP5 | Port 2 | Port 21 | t17 |
| IP10 | h | r | IP6 | Port 9 | Port 13 | t21 |

Refer to the related description in S102. As shown in Table 2, if all identifiers of the packet are the same, it indicates that the identifier that is sent by the layer-2 network device to the control device and is of the packet is a layer-3 identifier that is acquired by the layer-2 network device from a layer-3 header of the packet and is of the packet, or is a layer-3 identifier that is acquired by the layer-2 network device from a fixed position in a layer-2 header of the packet and is of the packet, or is a layer-2 identifier that is added by the gateway device into an extension field in the layer-2 header of the packet for the packet and is of the packet (a value of the layer-2 identifier of the packet, which is added by the gateway device is the same as a value of the layer-3 identifier of the packet), where the identifier "a" of the packet is the layer-2 identifier of the packet and the layer-3 identifier of the packet.

As shown in Table 3, if the identifiers of the packet are partially the same, it indicates that the identifier that is sent by the layer-2 network device to the control device and is of the packet is a layer-2 identifier that is acquired by the layer-2 network device from an extension field of a layer-2 header of the packet and is of the packet, or is a layer-2 identifier that is added by the gateway device into the extension field of the layer-2 header of the packet for the packet and is of the packet (a value of the layer-2 identifier of the packet, which is added by the gateway device is different from a value of the layer-3 identifier of the packet), where the identifier "a" of the packet is the layer-3 identifier of the packet, and the identifier "e" of the packet and the identifier "h" of the packet are layer-2 identifiers of the packet. The identifier "e" of the packet and the identifier "h" of the packet are mapped to the identifier "a" of the packet.

Further, the control device may use the attributes of network devices, which are sent by the network devices, as the transmission path of the packet. The control device may use the IP addresses of the network devices, which are shown in Table 2, as the transmission path of the packet; and the control device may also use the IP addresses of the network devices, the port numbers used by the network devices to receive the packet, and the port numbers used by the network devices to send the packet, which are shown in Table 3, as the transmission path of the packet, which is not limited by the present invention.

Specially, the gateway device is a layer-3 network device. In the method for determining a transmission path of a packet provided in the embodiment of the present invention, in addition to the method that the gateway device needs to execute as it serves as a layer-3 network device, for example, S302-S305, the gateway device also needs to execute S308-S310 shown in FIG. 4 or FIG. 5.

Further, in the method for determining a transmission path of a packet provided in the embodiment of the present invention, the packet may further include a color bit of the packet, where the color bit of the packet is used to indicate whether the packet is colored. Other network devices than network boundary devices (non-network-boundary devices) in the network devices may determine directly, according to the color bit of the packet, whether the packet is colored, so as to determine whether it is necessary to send the characteristic of the packet, the attribute of the packet, and the attribute of the network device to the control device, which avoids that a received packet is compared with the description of the packet to determine the packet, thereby saving device overheads significantly and improving efficiency in determining the transmission path of the packet. That the packet is colored indicates that the packet is a packet used to determine the transmission path, and that the packet is not colored indicates that the packet is not a packet used to determine the transmission path.

The network boundary devices may include a network boundary device at a transmit end of the packet, and a network boundary device at a receive end of the packet, where the network boundary device at the transmit end of the packet is a network device that is directly connected to the transmit end of the packet, and the network boundary device at the receive end of the packet is a network device that is directly connected to the receive end of the packet. Non-network-boundary devices are other network devices among the network devices than the network boundary device at the transmit end of the packet and the network boundary device at the receive end of the packet.

Figure 6:
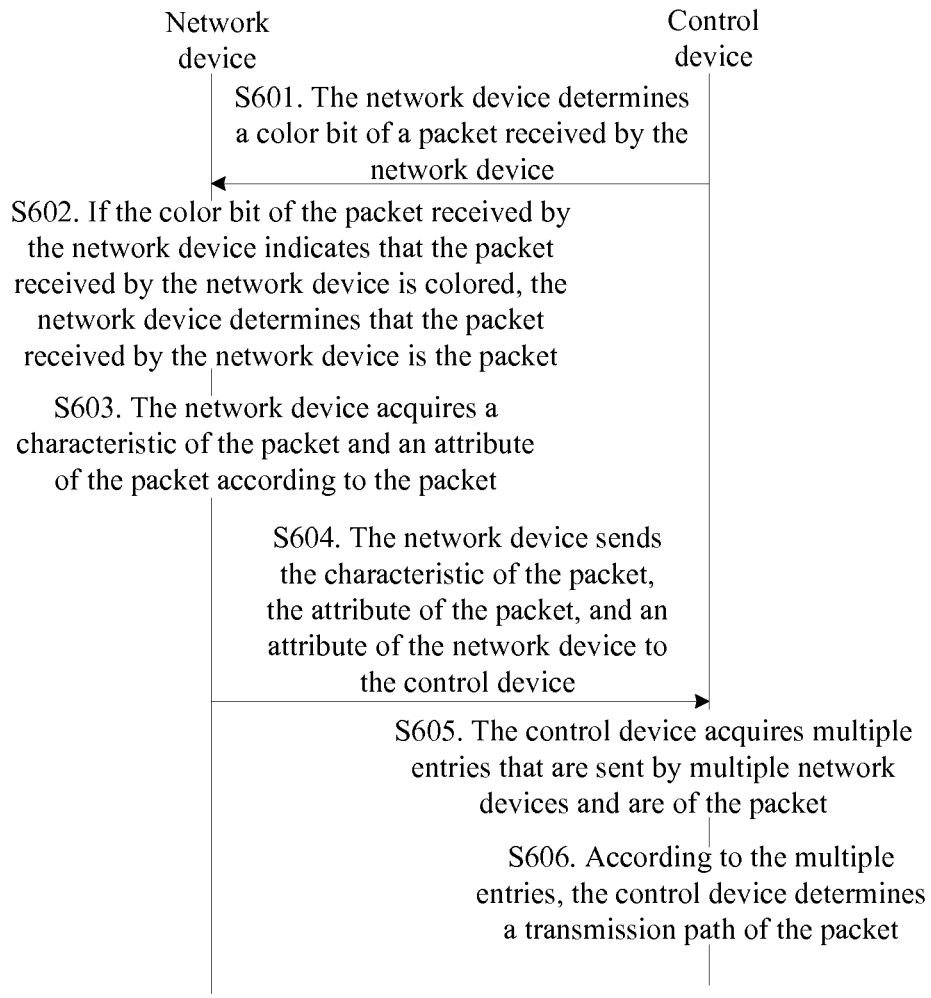
FIG. 6 is interaction diagram 2 of a method for determining a transmission path of a packet according to an embodiment of the present invention.

As shown in FIG. 6, in this scenario, the method for a network device (non-network-boundary device) to determine the packet may include the following.

S601. The network device determines a color bit of a packet received by the network device.

S602. If the color bit of the packet received by the network device indicates that the packet received by the network device is colored, the network device determines that the packet received by the network device is the packet.

According to indication of the color bit of the packet sent by the control device, the network device learns about a bit occupied by the color bit of the packet received by the network device, and thereby reads the color bit of the packet received by the network device. When the color bit of the packet received by the network device indicates that the packet received by the network device is colored, the network device may determine that the packet received by the network device is the packet, that is, the packet used to determine the transmission path.

S603. The network device acquires a characteristic of the packet and an attribute of the packet according to the packet.

S604. The network device sends the characteristic of the packet, the attribute of the packet, and an attribute of the network device to the control device.

S605. The control device acquires multiple entries that are sent by multiple network devices and are of the packet.

S606. According to the multiple entries, the control device determines a transmission path of the packet.

After the control device acquires the multiple entries that are sent by multiple network devices and are of the packet, the control device may determine the transmission path of the packet according to the multiple attributes of the packet when the multiple network devices receive the packet, and attributes of the multiple network devices in the multiple entries.

Further, in the method for determining a transmission path of a packet provided in the embodiment of the present invention, other steps S603-S606 performed after the network device uses S601-S602 shown in FIG. 6 to determine the packet are the same as other steps S304-S307 performed after the network device uses the method shown in FIG. 3 to determine the packet. For details of other steps S603-S606 performed after the network device determines the packet, reference may be made to the description about S304-S307 in the foregoing embodiment, and no repeated description is given herein.

Figure 7:
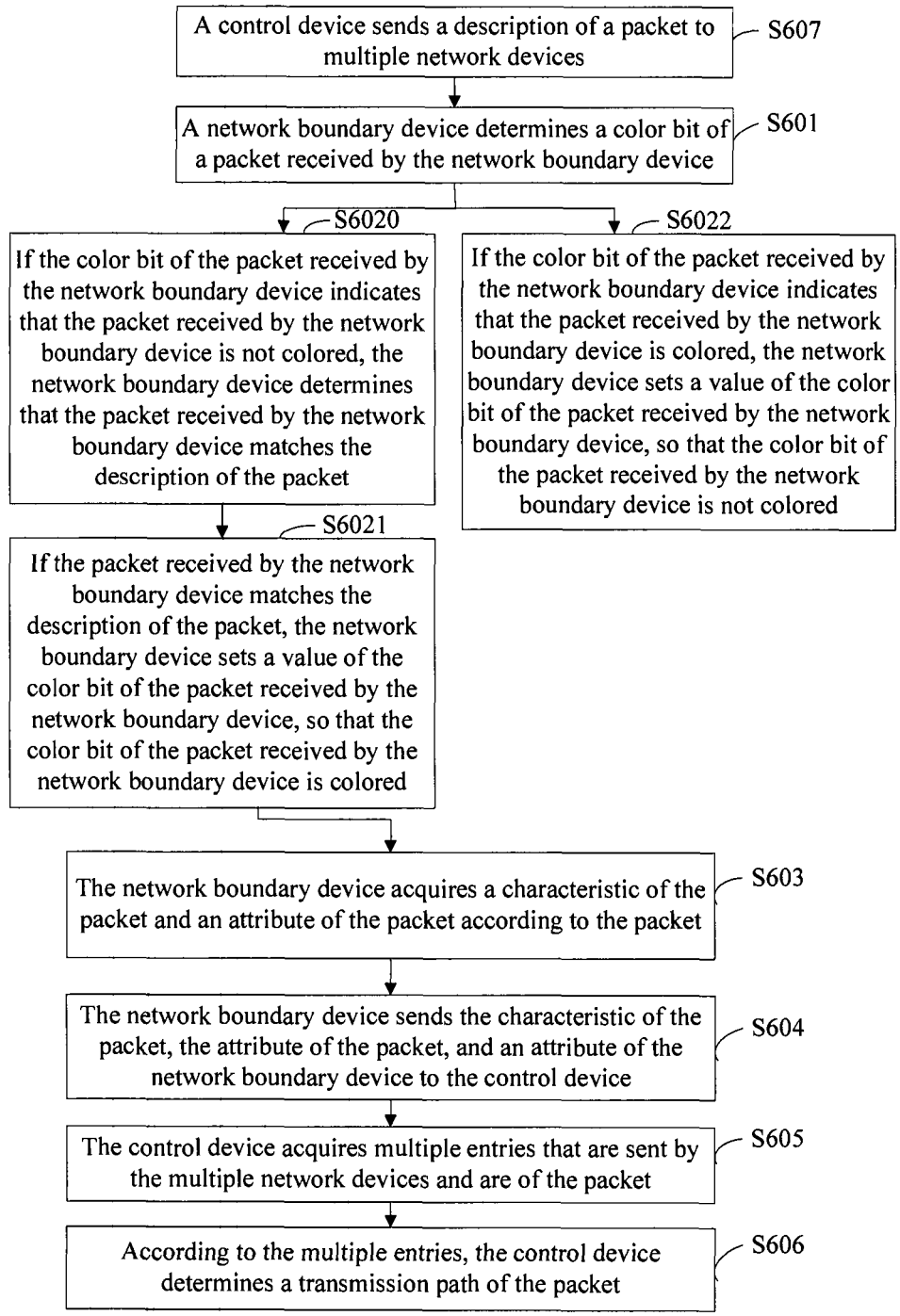
FIG. 7 is flowchart 5 of a method for determining a transmission path of a packet according to an embodiment of the present invention.

Further, in the method for determining a transmission path of a packet provided in the embodiment of the present invention, when the network device is a network boundary device, as shown in FIG. 7, before S601 shown in FIG. 6, the method may further include the following.

S607. The control device sends a description of a packet to multiple network devices.

The network device may include a network boundary device. For a description about S607, reference may be made to the description about S301, and no repeated description is given herein.

In the embodiment of the present invention, the control device sends the description of the packet to all network devices in a detection area manageable by the control device. However, in a scenario in which the packet includes a color bit of the packet, unless in a case in which the network boundary device determines that the packet received by the network boundary device is not colored, the network boundary device does not compare the packet received by the network boundary device with the description of the packet to determine whether the packet received by the network boundary device matches the description of the packet and to determine whether to color the packet received by the network boundary device.

As shown in FIG. 7, S602 shown in FIG. 6 may include the following.

S6020. If the color bit of the packet received by the network boundary device indicates that the packet received by the network boundary device is not colored, the network boundary device determines that the packet received by the network boundary device matches the description of the packet.

S6021. If the packet received by the network boundary device matches the description of the packet, the network boundary device sets a value of the color bit of the packet received by the network boundary device, so that the color bit of the packet received by the network boundary device is colored.

S6022. If the color bit of the packet received by the network boundary device indicates that the packet received by the network boundary device is colored, the network boundary device sets a value of the color bit of the packet received by the network boundary device, so that the color bit of the packet received by the network boundary device is not colored.

It should be noted that, if the network device is a non-network-boundary device, the method shown in FIG. 6 is performed; if the network device is a network boundary device, the method shown in FIG. 7 is performed. If the network boundary device is a network boundary device at a transmit end of the packet, the network boundary device may perform S6020-S6021; and if the network boundary device is a network boundary device at a receive end of the packet, the network boundary device may perform S6022. In the embodiment of the present invention, only a network boundary device can set the value of the color bit of the packet. Therefore, when the packet is transmitted from the transmit end of the packet to the network boundary device at the transmit end of the packet, the network boundary device at the transmit end of the packet sets the value of the color bit of the packet so that the packet is colored. Therefore, in a transmission process of the packet, according to the color bit of the packet, a non-network-boundary device may determine that the packet is a packet whose transmission path needs to be determined. Further, when the packet is transmitted to the network boundary device at the receive end of the packet, the network boundary device at the receive end of the packet sets the value of the color bit of the packet, so that the packet is not colored, thereby ensuring that the packet received by the receive end of the packet is the original packet sent by the transmit end of the packet.

Optionally, an idle bit in a packet header of the packet, for example, a specific bit in a service type field in the IP header of the packet or a specific bit in a Flags field in the IP header, may be used as the color bit of the packet. The specific setting may be determined according to actual conditions, and is not limited by the present invention.

Exemplarily, it may be set that, when the value of the color bit of the packet is 0, the color bit of the packet indicates that the packet is not colored; and when the value of the color bit of the packet is 1, the color bit of the packet indicates that the packet is colored; or it may be set that, when the value of the color bit of the packet is 1, the color bit of the packet indicates that the packet is not colored; and when the value of the color bit of the packet is 0, the color bit of the packet indicates that the packet is colored. The setting of the value of the color bit of the packet may be determined according to actual use requirements, and is not limited by the present invention.

Further, in S307 or S606, that is, after the control device determines the transmission path of the packet according to multiple entries, the control device may store the determined transmission path of the packet. In this way, when a fault occurs in a transmission process of the packet, the faulty transmission path or device of the packet can be located quickly and accurately according to the transmission path that is stored by the control device and is of the packet, so as to monitor the transmission process of the packet and thereby improve stability of the entire network.

In the method for determining a transmission path of a packet provided in the embodiment of the present invention, because a packet that actually flows through a network device is used in determining the transmission path of the packet, in comparison with a conventional method in which a simulated packet is used to determine a transmission path of a packet (the transmission path of the packet may represent a transmission path of a service flow that includes the packet), it is not necessary to learn about a structure of the simulated packet before determining the transmission path of the packet; and it is avoided that simulated packets occupy a large amount of network bandwidth and network device resources; and an actual transmission path of the packet can be determined in real time, and a problem is avoided that the determined transmission path of the packet is not accurate enough due to randomness of routing and forwarding of a network device, so that the transmission path of the packet can be determined conveniently and accurately in real time.

The embodiment of the present invention provides a method for determining a transmission path of a packet, where a network device determines a packet, and the network device acquires a characteristic of the packet and an attribute of the packet according to the packet; the network device sends the characteristic of the packet, the attribute of the packet, and an attribute of the network device to a control device; and the control device determines a transmission path of the packet according to the characteristic of the packet, the attribute of the packet, and the attribute of the network device. According to this solution, because the network device may send, to the control device, the characteristic of the packet that actually flows through the network device, the attribute of the packet, and the attribute of the network device, the control device can determine a transmission path of the packet that actually flows through the network device, that is, an actual transmission path of the packet, according to the characteristic of the packet that actually flows through the network device, the attribute of the packet, and the attribute of the network device. Therefore, a problem that a determined transmission path of a packet is generally not accurate enough and that the determining of a transmission path of a packet affects normal packet transmission due to occupation of a large amount of network bandwidth is solved, the transmission path of the packet can be determined accurately, and the determining of a transmission path of a packet does not affect normal packet transmission.

Embodiment 3

Figure 8:
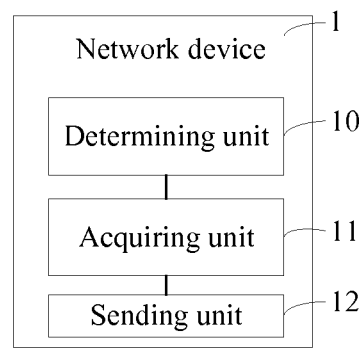
FIG. 8 is schematic structural diagram 1 of a network device according to an embodiment of the present invention.

As shown in FIG. 8, the embodiment of the present invention provides a network device 1, where the network device 1 may include a determining unit 10 configured to determine a packet; an acquiring unit 11 configured to acquire a characteristic of the packet and an attribute of the packet according to the packet determined by the determining unit 10; and a sending unit 12 configured to send the characteristic of the packet and the attribute of the packet that are acquired by the acquiring unit 11, and an attribute of the network device to a control device, so that the control device determines a transmission path of the packet according to the characteristic of the packet, the attribute of the packet, and the attribute of the network device.

Optionally, the network device 1 is a layer-2 network device, the characteristic that is acquired by the acquiring unit 11 and is of the packet includes a layer-3 identifier of the packet, and the attribute that is acquired by the acquiring unit 11 and is of the packet includes TTL of the packet and time of arrival of the packet at the layer-2 network device; or, the characteristic that is acquired by the acquiring unit 11 and is of the packet includes a layer-2 identifier of the packet, and the attribute that is acquired by the acquiring unit 11 and is of the packet includes TTL of the packet and time of arrival of the packet at the layer-2 network device.

Optionally, the network device 1 is a layer-3 network device, the characteristic that is acquired by the acquiring unit 11 and is of the packet includes a layer-3 identifier of the packet, and the attribute that is acquired by the acquiring unit 11 and is of the packet includes TTL of the packet.

Figure 9:
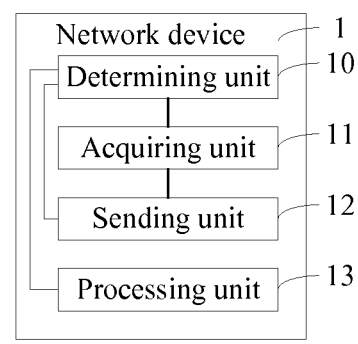
FIG. 9 is schematic structural diagram 2 of a network device according to an embodiment of the present invention.

Optionally, as shown in FIG. 9, the network device 1 is a gateway device, and the gateway device further includes a processing unit 13; the determining unit 10 is further configured to determine whether the packet includes a layer-2 identifier of the packet; the sending unit 12 is further configured to, if the determining unit 10 determines that the packet includes the layer-2 identifier of the packet, send the layer-2 identifier of the packet, the layer-3 identifier of the packet, a mapping between the layer-2 identifier of the packet and the layer-3 identifier of the packet, and an IP address of the gateway device to the control device, and the processing unit 13 is configured to remove the layer-2 identifier of the packet from the packet determined by the determining unit 10; and the processing unit 13 is further configured to, if the determining unit 10 determines that the packet does not include the layer-2 identifier of the packet, add the layer-2 identifier of the packet into the packet, and the sending unit 12 is further configured to send the layer-2 identifier of the packet, the layer-3 identifier of the packet, the mapping between the layer-2 identifier of the packet and the layer-3 identifier of the packet, and the IP address of the gateway device to the control device.

Optionally, the network device 1 is a gateway device; the determining unit 10 is further configured to determine whether the packet includes a layer-2 identifier of the packet; and the processing unit 13 is further configured to, if the determining unit 10 determines that the packet includes the layer-2 identifier of the packet, remove the layer-2 identifier of the packet from the packet, and if the determining unit 10 determines that the packet does not include the layer-2 identifier of the packet, add the layer-2 identifier of the packet into the packet, where a value of the layer-2 identifier of the packet is the same as a value of the layer-3 identifier of the packet.

Optionally, the acquiring unit 11 is further configured to, before the determining unit 10 determines the packet, acquire a description that is sent by the control device and is of the packet; and the determining unit 10 is configured to compare the description that is acquired by the acquiring unit 11 and is of the packet with a received packet; and if the received packet matches the description of the packet, determine that the received packet is the packet.

Optionally, the packet determined by the determining unit 10 includes a color bit of the packet, where the color bit of the packet is used to indicate whether the packet is colored, and the determining unit 10 is configured to determine a color bit of a received packet, and if the color bit of the received packet indicates that the received packet is colored, determine that the received packet is the packet.

Optionally, when the network device 1 is a network boundary device, the determining unit 10 is further configured to, if the color bit of the received packet indicates that the received packet is not colored, determine whether the received packet matches the description of the packet; and the processing unit 13 is further configured to, if the received packet matches the description of the packet, set a value of the color bit of the received packet so that the color bit of the received packet is colored.

Optionally, when the network device 1 is a network boundary device, the determining unit 10 is further configured to, if the color bit of the received packet indicates that the received packet is colored, set the value of the color bit of the received packet so that the color bit of the received packet is not colored.

Optionally, the characteristic of the packet may further include a source IP address of the packet, or a source IP address of the packet and a destination IP address of the packet.

Optionally, the description of the packet may include one or more of a source IP address of the packet, a destination IP address of the packet, a protocol port number of the packet, and a DSCP of the packet.

Optionally, the attribute of the network device may include at least one of an IP address of the network device, a MAC address of the network device, and a serial number allocated by a network management device to the network device.

Optionally, the attribute of the network device may further include at least one of a port number used by the network device to receive the packet, and a port number used by the network device to send the packet.

The network device 1 provided in the embodiment of the present invention may be a network switch or a router or the like.

The embodiment of the present invention provides a network device, where the network device determines a packet, the network device acquires a characteristic of the packet and an attribute of the packet according to the packet, and the network device sends the characteristic of the packet, the attribute of the packet, and an attribute of the network device to a control device; and the control device determines a transmission path of the packet according to the characteristic of the packet, the attribute of the packet, and the attribute of the network device. According to this solution, because the network device may send, to the control device, the characteristic of the packet that actually flows through the network device, the attribute of the packet, and the attribute of the network device, the control device can determine a transmission path of the packet that actually flows through the network device, that is, an actual transmission path of the packet, according to the characteristic of the packet that actually flows through the network device, the attribute of the packet, and the attribute of the network device. Therefore, a problem that a determined transmission path of a packet is generally not accurate enough and that the determining of a transmission path of a packet affects normal packet transmission due to occupation of a large amount of network bandwidth is solved, the transmission path of the packet can be determined accurately, and the determining of a transmission path of a packet does not affect normal packet transmission.

Figure 10:
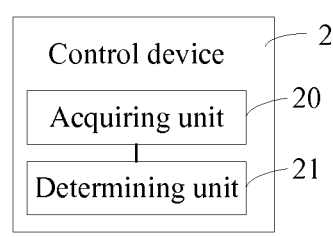
FIG. 10 is schematic structural diagram 1 of a control device according to an embodiment of the present invention.

As shown in FIG. 10, the embodiment of the present invention provides a control device 2, where the control device 2 may include an acquiring unit 20 configured to acquire multiple entries that are sent by multiple network devices and are of a packet, where characteristics of the packet in the multiple entries are the same or the characteristics of the packet in the multiple entries are corresponding to each other, and each entry of the multiple entries includes a characteristic of the packet, an attribute of the packet that the packet has when a network device that sends the entry receives the packet, and an attribute of the network device that sends the entry; and a determining unit 21 configured to determine a transmission path of the packet according to multiple attributes of the packet when the multiple network devices receive the packet, and attributes of the multiple network devices in the multiple entries acquired by the acquiring unit 20.

Optionally, the multiple network devices include a layer-2 network device, a characteristic of the packet in an entry sent by the layer-2 network device includes a layer-3 identifier of the packet, and an attribute of the packet in the entry sent by the layer-2 network device includes TTL of the packet received by the layer-2 network device and time of arrival of the packet at the layer-2 network device; or, a characteristic of the packet in an entry sent by the layer-2 network device includes a layer-2 identifier of the packet, and an attribute of the packet in the entry sent by the layer-2 network device includes TTL of the packet received by the layer-2 network device and time of arrival of the packet at the layer-2 network device.

Optionally, the multiple network devices include a layer-3 network device, a characteristic of the packet in an entry sent by the layer-3 network device includes the layer-3 identifier of the packet, and an attribute of the packet in the entry sent by the layer-3 network device includes TTL of the packet received by the layer-3 network device.

Optionally, the determining unit 21 is configured to sort the multiple entries according to the TTL of the packet and the time of arrival of the packet at the layer-2 network device; and determine that the attributes of the multiple network devices in the sorted multiple entries are the transmission path of the packet.

Optionally, the network device is a gateway device, and the acquiring unit 20 is further configured to acquire the layer-2 identifier of the packet, the layer-3 identifier of the packet, a mapping between the layer-2 identifier of the packet and the layer-3 identifier of the packet, and an IP address of the gateway device that are sent by the gateway device.

Optionally, the multiple entries acquired by the acquiring unit 20 include entries that have a same value of the layer-2 identifier of the packet and entries that have a same value of the layer-3 identifier of the packet, where the layer-2 identifier of the packet is mapped to the layer-3 identifier of the packet according to the mapping.

Figure 11:
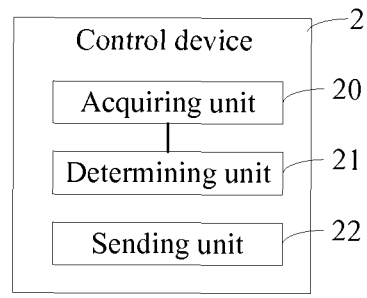
FIG. 11 is schematic structural diagram 2 of a control device according to an embodiment of the present invention.

Optionally, as shown in FIG. 11, the control device may further include a sending unit 22, where the sending unit 22 is further configured to, before the acquiring unit 20 acquires the multiple entries that are sent by the multiple network devices and are of the packet, send a description of the packet to the multiple network devices.

Optionally, the description of the packet may include one or more of a source IP address of the packet, a destination IP address of the packet, a protocol port number of the packet, and a DSCP of the packet.

Optionally, the characteristic of the packet may further include a source IP address of the packet, or a source IP address of the packet and a destination IP address of the packet.

Optionally, the attributes of the multiple network devices may include at least one of IP addresses of the multiple network devices, MAC addresses of the multiple network devices, and serial numbers allocated by a network management device to the multiple network devices.

Optionally, the attributes of the multiple network devices may further include at least one of port numbers used by the multiple network devices to receive the packet, and port numbers used by the multiple network devices to send the packet.

The control device 2 provided in the embodiment of the present invention may be a network management device or a controller or the like.

The embodiment of the present invention provides a control device, where the control device acquires multiple entries that are sent by multiple network devices and are of a packet, where characteristics of the packet in the multiple entries are the same or the characteristics of the packet in the multiple entries are corresponding to each other, and each entry of the multiple entries includes a characteristic of the packet, an attribute of the packet that the packet has when a network device that sends the entry receives the packet, and an attribute of the network device that sends the entry; and the control device determines a transmission path of the packet according to multiple attributes of the packet when the multiple network devices receive the packet, and attributes of the multiple network devices in the multiple entries. According to this solution, because the control device can acquire the characteristic of the packet that is sent by the network device and actually flows through the network device, the attribute of the packet, and the attribute of the network device, and determine a transmission path of the packet that actually flows through the network device, that is, an actual transmission path of the packet, according to the characteristic of the packet that actually flows through the network device, the attribute of the packet, and the attribute of the network device. Therefore, a problem that a determined transmission path of a packet is generally not accurate enough and that the determining of a transmission path of a packet affects normal packet transmission due to occupation of a large amount of network bandwidth is solved, the transmission path of the packet can be determined accurately, and the determining of a transmission path of a packet does not affect normal packet transmission.

Embodiment 4

Figure 12:
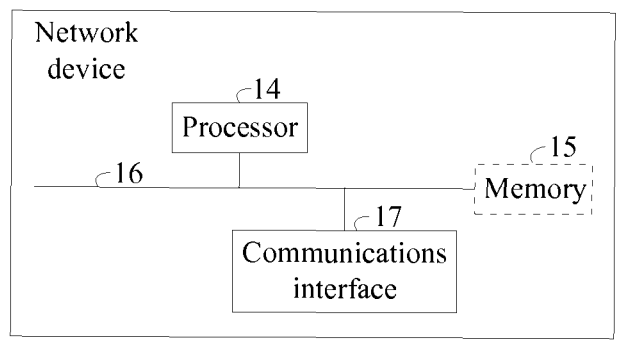
FIG. 12 is schematic structural diagram 3 of a network device according to an embodiment of the present invention.

As shown in FIG. 12, this embodiment of the present invention provides a network device, where the network device may include a processor 14, a system bus 16, and a communications interface 17.

The processor 14 may be a central processing unit (CPU), or a network processor (NP).

If the processor 14 is a CPU, the network device further includes a memory 15 configured to store program code and transmit the program code to the processor 14, and the processor 14 executes the following instructions according to the program code. The memory 15 may include a volatile memory such as a random access memory (RAM); or the memory 15 may also include a non-volatile memory such as a read-only memory (ROM), a flash memory, a hard disk drive (HDD) or a solid-state drive (SSD); and the memory 15 may also a combination of such types of memories. The processor 14, the memory 15 and the communications interface 17 are interconnected through a system bus 16 and communicate with each other.

The communications interface 17 may be implemented by an optical transceiver, an electrical transceiver, a radio transceiver, or any combination thereof. For example, the optical transceiver may be a small form-factor pluggable (SFP) transceiver, an enhanced small form-factor pluggable (SFP+) transceiver or a 10 Gigabit small form-factor pluggable (XFP) transceiver. The electrical transceiver may be an Ethernet network interface controller (NIC). The radio transceiver may be a wireless network interface controller (WNIC).

When the network device runs, the processor 14 runs executable instructions of the network device to execute the method process shown in FIG. 1 or any one of FIG. 3 to FIG. 7, including the processor 14 is configured to determine a packet; and acquire a characteristic of the packet and an attribute of the packet according to the packet; and send the characteristic of the packet, the attribute of the packet, and an attribute of the network device to a control device through the communications interface 17; and the control device determines a transmission path of the packet according to the characteristic of the packet, the attribute of the packet, and the attribute of the network device; and the memory 15 is configured to store the characteristic of the packet, the attribute of the packet, the attribute of the network device, and a program that controls the processor 14 to complete the foregoing process, so that the processor 14 completes the foregoing process by executing the program and invoking the characteristic of the packet, the attribute of the packet, and the attribute of the network device.

Optionally, the network device is a layer-2 network device, the characteristic that is acquired by the processor 14 and is of the packet includes a layer-3 identifier of the packet, and the attribute that is acquired by the processor 14 and is of the packet includes TTL of the packet and time of arrival of the packet at the layer-2 network device; or, the characteristic that is acquired by the processor 14 and is of the packet includes a layer-2 identifier of the packet, and the attribute that is acquired by the processor 14 and is of the packet includes TTL of the packet and time of arrival of the packet at the layer-2 network device.

Optionally, the network device is a layer-3 network device, the characteristic that is acquired by the processor 14 and is of the packet includes a layer-3 identifier of the packet, and the attribute that is acquired by the processor 14 and is of the packet includes TTL of the packet.

Optionally, the network device is a gateway device; the processor 14 is further configured to determine whether the packet includes a layer-2 identifier of the packet; and if the packet includes the layer-2 identifier of the packet, send the layer-2 identifier of the packet, the layer-3 identifier of the packet, a mapping between the layer-2 identifier of the packet and the layer-3 identifier of the packet, and the IP address of the gateway device to the control device from the communications interface 17, and remove the layer-2 identifier of the packet from the packet; and the processor 14 is further configured to, if the packet does not include the layer-2 identifier of the packet, add the layer-2 identifier of the packet into the packet, and send the layer-2 identifier of the packet, the layer-3 identifier of the packet, the mapping between the layer-2 identifier of the packet and the layer-3 identifier of the packet, and the IP address of the gateway device to the control device from the communications interface 17.

Optionally, the network device is a gateway device; and the processor 14 is further configured to determine whether the packet includes a layer-2 identifier of the packet; and if the packet includes the layer-2 identifier of the packet, remove the layer-2 identifier of the packet from the packet, and if the packet does not include the layer-2 identifier of the packet, add the layer-2 identifier of the packet into the packet, where a value of the layer-2 identifier of the packet is the same as a value of the layer-3 identifier of the packet.

Optionally, the processor 14 is further configured to, before determining the packet, acquire a description that is sent by the control device and is of the packet from the communications interface 17; and the processor 14 is configured to compare the description of the packet with a received packet; and if the received packet matches the description of the packet, determine that the received packet is the packet.

Optionally, the packet determined by the processor 14 includes a color bit of the packet, where the color bit of the packet is used to indicate whether the packet is colored; and the processor 14 is configured to determine a color bit of a received packet, and if the color bit of the received packet indicates that the received packet is colored, determine that the received packet is the packet.

Optionally, when the network device is a network boundary device, the processor 14 is further configured to, if the color bit of the received packet indicates that the received packet is not colored, determine whether the received packet matches the description of the packet; and if the received packet matches the description of the packet, set the value of the color bit of the received packet so that the color bit of the received packet is colored.

Optionally, when the network device is a network boundary device, the processor 14 is further configured to, if the color bit of the received packet indicates that the received packet is colored, set the value of the color bit of the received packet so that the color bit of the received packet is not colored.

Optionally, the characteristic of the packet may further include a source IP address of the packet, or a source IP address of the packet and a destination IP address of the packet.

Optionally, the description of the packet may include one or more of a source IP address of the packet, a destination IP address of the packet, a protocol port number of the packet, and a DSCP of the packet.

Optionally, the attribute of the network device may include at least one of an IP address of the network device, a MAC address of the network device, and a serial number allocated by a network management device to the network device.

Optionally, the attribute of the network device may further include at least one of a port number used by the network device to receive the packet, and a port number used by the network device to send the packet.

The network device provided in the embodiment of the present invention may be a network switch or a router or the like.

The embodiment of the present invention provides a network device, where the network device determines a packet, the network device acquires a characteristic of the packet and an attribute of the packet according to the packet, and the network device sends the characteristic of the packet, the attribute of the packet, and an attribute of the network device to a control device; and the control device determines a transmission path of the packet according to the characteristic of the packet, the attribute of the packet, and the attribute of the network device. According to this solution, because the network device may send, to the control device, the characteristic of the packet that actually flows through the network device, the attribute of the packet, and the attribute of the network device, the control device can determine a transmission path of the packet that actually flows through the network device, that is, an actual transmission path of the packet, according to the characteristic of the packet that actually flows through the network device, the attribute of the packet, and the attribute of the network device. Therefore, a problem that a determined transmission path of a packet is generally not accurate enough and that the determining of a transmission path of a packet affects normal packet transmission due to occupation of a large amount of network bandwidth is solved, the transmission path of the packet can be determined accurately, and the determining of a transmission path of a packet does not affect normal packet transmission.

Figure 13:
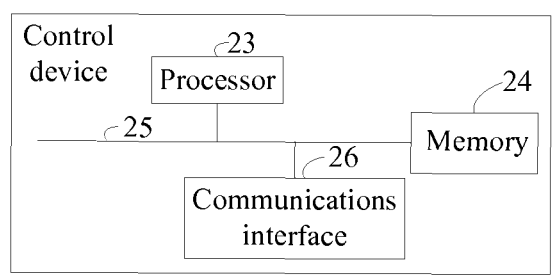
FIG. 13 is schematic structural diagram 3 of a control device according to an embodiment of the present invention.

As shown in FIG. 13, the embodiment of the present invention provides a control device, where the control device may include a processor 23, a memory 24, a system bus 25, and a communications interface 26. The processor 23, the memory 24 and the communications interface 26 are interconnected through a system bus 25 and communicate with each other.

The processor 23 is a central processing unit.

The memory 24 may include a RAM, and may also include a non-volatile memory, for example, at least one disk memory.

When the control device runs, the processor 23 runs executable instructions of the control device to execute the method process shown in FIG. 2 or any one of FIG. 3 to FIG. 7, including the processor 23 is configured to acquire multiple entries that are sent by multiple network devices and are of a packet from the communications interface 26, where characteristics of the packet in the multiple entries are the same or the characteristics of the packet in the multiple entries are corresponding to each other, and each entry of the multiple entries includes a characteristic of the packet, an attribute of the packet that the packet has when a network device that sends the entry receives the packet, and an attribute of the network device that sends the entry; and determine a transmission path of the packet according to multiple attributes of the packet when the multiple network devices receive the packet, and attributes of the multiple network devices in the multiple entries; and the memory 24 is configured to store the multiple entries and is configured to store a program that controls the processor 23 to complete the foregoing process, so that the processor 23 completes the foregoing process by executing the program and invoking the multiple entries.

Optionally, the multiple network devices include a layer-2 network device, a characteristic of the packet in an entry sent by the layer-2 network device includes a layer-3 identifier of the packet, and an attribute of the packet in the entry sent by the layer-2 network device includes TTL of the packet received by the layer-2 network device and time of arrival of the packet at the layer-2 network device; or, a characteristic of the packet in an entry sent by the layer-2 network device includes a layer-2 identifier of the packet, and an attribute of the packet in the entry sent by the layer-2 network device includes TTL of the packet received by the layer-2 network device and time of arrival of the packet at the layer-2 network device.

Optionally, the multiple network devices include a layer-3 network device, a characteristic of the packet in an entry sent by the layer-3 network device includes the layer-3 identifier of the packet, and an attribute of the packet in the entry sent by the layer-3 network device includes TTL of a packet received by the layer-3 network device.

Optionally, the processor 23 is configured to sort the multiple entries according to the TTL of the packet and the time of arrival of the packet at the layer-2 network device; and determine that the attributes of the multiple network devices in the sorted multiple entries are the transmission path of the packet.

Optionally, the network device is a gateway device, and the processor 23 is further configured to acquire the layer-2 identifier of the packet, the layer-3 identifier of the packet, a mapping between the layer-2 identifier of the packet and the layer-3 identifier of the packet, and an IP address of the gateway device that are sent by the gateway device.

Optionally, the multiple entries acquired by the processor 23 include entries that have a same value of the layer-2 identifier of the packet and entries that have a same value of the layer-3 identifier of the packet, where the layer-2 identifier of the packet is mapped to the layer-3 identifier of the packet according to the mapping.

Optionally, the processor 23 is further configured to, before acquiring the multiple entries that are sent by the multiple network devices and are of the packet, send a description of the packet to the multiple network devices.

Optionally, the description of the packet may include one or more of a source IP address of the packet, a destination IP address of the packet, a protocol port number of the packet, and a DSCP of the packet.

Optionally, the characteristic of the packet may further include a source IP address of the packet, or a source IP address of the packet and a destination IP address of the packet.

Optionally, the attributes of the multiple network devices may include at least one of IP addresses of the multiple network devices, MAC addresses of the multiple network devices, and serial numbers allocated by a network management device to the multiple network devices.

Optionally, the attributes of the multiple network devices may further include at least one of port numbers used by the multiple network devices to receive the packet, and port numbers used by the multiple network devices to send the packet.

The control device provided in the embodiment of the present invention may be a network management device or a controller or the like.

The embodiment of the present invention provides a control device, where the control device acquires multiple entries that are sent by multiple network devices and are of a packet, where characteristics of the packet in the multiple entries are the same or the characteristics of the packet in the multiple entries are corresponding to each other, and each entry of the multiple entries includes a characteristic of the packet, an attribute of the packet that the packet has when a network device that sends the entry receives the packet, and an attribute of the network device that sends the entry, and the control device determines a transmission path of the packet according to multiple attributes of the packet when the multiple network devices receive the packet, and attributes of the multiple network devices in the multiple entries. According to this solution, because the control device can acquire the characteristic of the packet that is sent by the network device and actually flows through the network device, the attribute of the packet, and the attribute of the network device, and determine a transmission path of the packet that actually flows through the network device, that is, an actual transmission path of the packet, according to the characteristic of the packet that actually flows through the network device, the attribute of the packet, and the attribute of the network device. Therefore, a problem that a determined transmission path of a packet is generally not accurate enough and that the determining of a transmission path of a packet affects normal packet transmission due to occupation of a large amount of network bandwidth is solved, the transmission path of the packet can be determined accurately, and the determining of a transmission path of a packet does not affect normal packet transmission.

Embodiment 5

Figure 14:
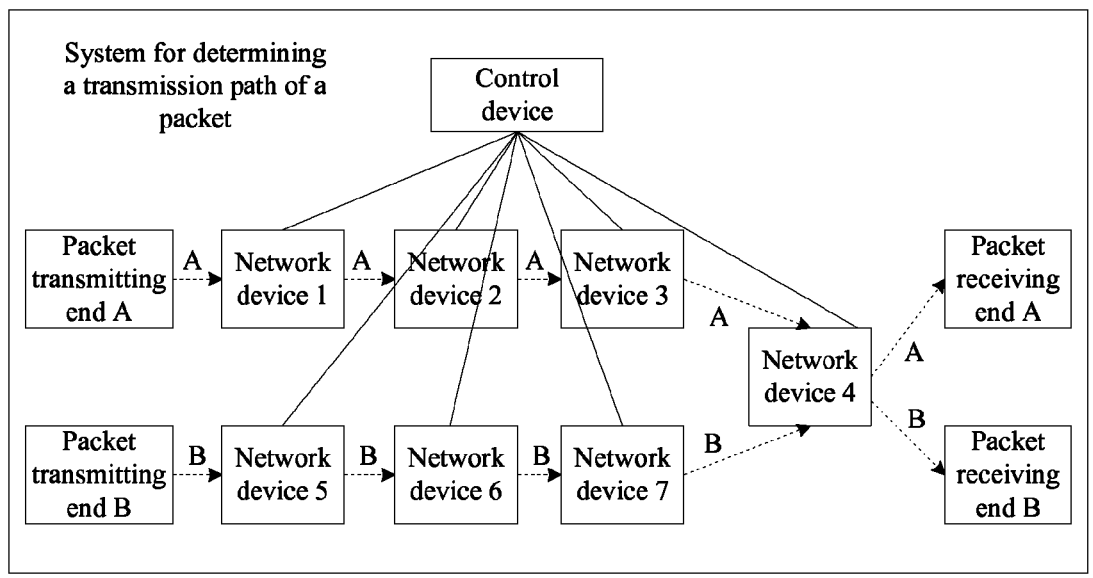
FIG. 14 is a block diagram of a system for determining a transmission path of a packet according to an embodiment of the present invention.

As shown in FIG. 14, this embodiment of the present invention provides a system for determining a transmission path of a packet. The system for determining a transmission path of a packet may include multiple network devices and the control device according to Embodiment 3; or the system for determining a transmission path of a packet may include multiple network devices and the control device according to Embodiment 4.

For a detailed process used by the network devices and the control device to execute the method for determining a transmission path of a packet provided in the embodiments of the present invention so as to determine a transmission path of a packet, reference may be made to the related description in Embodiment 1 and Embodiment 2, and no repeated description is given herein.

For example, as shown in FIG. 14, it is assumed that the system for determining a transmission path of a packet includes a control device, and that a detection area manageable by the control device includes 7 network devices: network device 1, network device 2, network device 3, network device 4, network device 5, a network device 6, and network device 7. If there are two packets, packet A and packet B, packet A needs to be sent from packet transmitting end A to packet receiving end A, and packet B needs to be sent from packet transmitting end B to packet receiving end B, then in a process of transmitting the two packets, the method for determining a transmission path of a packet according to the embodiment of the present invention may be used to determine actual transmission paths of the two packets in a network.

When packet A is sent from packet transmitting end A, and flows through network device 1, network device 2, network device 3, and network device 4 until it arrives at packet receiving end A, the corresponding network device 1, network device 2, network device 3, and network device 4 may separately execute the method for determining a transmission path of a packet according to the embodiment of the present invention, and send a characteristic of the packet, an attribute of the packet, and an attribute of the network device to the control device, so that the control device may determine, according to the information sent by network device 1, network device 2, network device 3, and network device 4, that the transmission path of packet A is "packet transmitting end A-network device 1-network device 2-network device 3-network device 4-packet receiving end A". When the packet in packet B is sent from packet transmitting end B, and flows through network device 5, network device 6, network device 7, and network device 4 until it arrives at packet receiving end B, the corresponding network device 5, network device 6, network device 7, and network device 4 may separately execute the method for determining a transmission path of a packet according to the embodiment of the present invention, and send a characteristic of the packet, an attribute of the packet, and an attribute of the network device to the control device, so that the control device can determine, according to the information sent by network device 5, network device 6, network device 7, and network device 4, that the transmission path of packet B is "packet transmitting end B-network device 5-network device 6-network device 7-network device 4-packet receiving end B". By using the system for determining a transmission path of a packet, a transmission path of the packet can be determined accurately, and the determining of a transmission path of a packet does not affect normal packet transmission. In this way, when a fault occurs in the transmission process of the packet, a faulty transmission path or device of the packet can be located quickly and accurately, and further, the transmission process of the packet may be monitored, so as to improve stability of the entire network.

The embodiment of the present invention provides a system for determining a transmission path of a packet, where a network device that the packet flows through determines a packet, and the network device acquires a characteristic of the packet and an attribute of the packet according to the packet; the network device sends the characteristic of the packet, the attribute of the packet, and an attribute of the network device to a control device; and the control device determines a transmission path of the packet according to multiple characteristics of the packet, multiple attributes of the packet when multiple network devices receive the packet, and attributes of the multiple network devices, where the characteristics, the attributes of the packet, and the attributes of the network devices are sent by the multiple network devices that the packet flows through. According to this solution, because the network device may send, to the control device, the characteristic of the packet that actually flows through the network device, the attribute of the packet, and the attribute of the network device, the control device can determine a transmission path of the packet that actually flows through the network device, that is, an actual transmission path of the packet, according to the characteristic of the packet that actually flows through the network device, the attribute of the packet, and the attribute of the network device. Therefore, a problem that a determined transmission path of a packet is generally not accurate enough and that the determining of a transmission path of a packet affects normal packet transmission due to occupation of a large amount of network bandwidth is solved, the transmission path of the packet can be determined accurately, and the determining of a transmission path of a packet does not affect normal packet transmission.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between the apparatuses or units through some interfaces.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in the form of a software functional unit.

When the integrated unit is implemented in the form of a software functional unit and sold or used as an independent product, the integrated unit may be stored in a computer-readable storage medium. Based on such an understanding, a part or all of the technical solutions of the present invention may be implemented in a form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium is a non-transitory medium, including all kinds of media that can store program code, such as a flash memory, a removable hard disk, a read-only memory, a random access memory, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining a transmission path of a packet, comprising:
    acquiring, by a layer-2 network device, a characteristic of a packet and an attribute of the packet according to the packet, wherein the characteristic of the packet comprises a layer-3 identifier of the packet or a layer-2 identifier of the packet, and wherein the attribute of the packet comprises time to live (TTL) of the packet and time of arrival of the packet at the layer-2 network device; and
    sending, by the layer-2 network device, the characteristic of the packet, the attribute of the packet, and an attribute of the layer-2 network device to a control device such that the control device determines a traversed transmission path of the packet according to the characteristic of the packet, the attribute of the packet, and the attribute of the layer-2 network device.

2. The method according to claim 1, further comprising:
    acquiring, by a layer-3 network device, a characteristic of a second packet and an attribute of the second packet according to the second packet, wherein the characteristic of the second packet comprises a layer-3 identifier of the second packet, and the attribute of the second packet comprises TTL of the second packet; and
    sending, by the layer-3 network device, the characteristic of the second packet, the attribute of the second packet, and an attribute of the layer-3 network device to a control device such that the control device determines a traversed transmission path of the second packet according to the characteristic of the second packet, the attribute of the second packet, and the attribute of the layer-3 network device.

3. The method according to claim 2, wherein the layer-3 network device is a gateway device of a 3-layer network in communication with a layer-2 network, and wherein the method further comprises:
    determining, by the gateway device, whether the second packet comprises a layer-2 identifier of the second packet;
    when the second packet comprises the layer-2 identifier of the second packet, sending, by the gateway device to the control device, the layer-2 identifier of the second packet, the layer-3 identifier of the second packet, a mapping between the layer-2 identifier of the second packet and the layer-3 identifier of the second packet, and an IP address of the gateway device, and removing the layer-2 identifier of the second packet from the second packet; and
    when the second packet does not comprise the layer-2 identifier of the second packet, adding, by the gateway device, the layer-2 identifier of the packet into the second packet, and sending, to the control device, the layer-2 identifier of the second packet, the layer-3 identifier of the second packet, a mapping between the layer-2 identifier of the second packet and the layer-3 identifier of the second packet, and an IP address of the gateway device.

4. The method according to claim 2, wherein the layer-3 network device is a gateway device of a 3-layer network in communication with a layer-2 network, and wherein the method further comprises:
determining, by the gateway device, whether the second packet comprises a layer-2 identifier of the second packet;
when the second packet comprises the layer-2 identifier of the second packet, removing, by the gateway device, the layer-2 identifier of the second packet from the second packet, wherein a value of the layer-2 identifier of the second packet is the same as a value of the layer-3 identifier of the second packet; and
when the second packet does not comprise the layer-2 identifier of the second packet, adding, by the gateway device, the layer-2 identifier of the second packet into the second packet, wherein a value of the layer-2 identifier of the second packet is the same as a value of the layer-3 identifier of the second packet.

5. A method for determining a transmission path of a packet, comprising:
acquiring, by a control device, multiple entries that are sent by multiple network devices and are of a packet, wherein characteristics of the packet in the multiple entries are the same or the characteristics of the packet in the multiple entries are corresponding to each other, and each entry of the multiple entries comprises a characteristic of the packet, an attribute of the packet that the packet has when a network device that sends the entry receives the packet, and an attribute of the network device that sends the entry; and
determining, by the control device, a traversed transmission path of the packet according to multiple attributes of the packet when the multiple network devices receive the packet, and attributes of the multiple network devices in the multiple entries,
wherein the multiple network devices comprise a layer-2 network device, a characteristic of the packet in an entry sent by the layer-2 network device comprises a layer-3 identifier of the packet, and an attribute of the packet in the entry sent by the layer-2 network device comprises time to live (TTL) of the packet received b the layer-2 network device and time of arrival of the packet at the layer-2 network device, or wherein a characteristic of the packet in an entry sent by the layer-2 network device comprises a layer-2 identifier of the packet, and an attribute of the packet in the entry sent by the layer-2 network device comprises TTL of the packet received by the layer-2 network device and time of arrival of the packet at the layer-2 network device.

6. The method according to claim 5, wherein the multiple network devices further comprise a layer-3 network device, a characteristic of the packet in an entry sent by the layer-3 network device comprises a layer-3 identifier of the packet, and an attribute of the packet in the entry sent by the layer-3 network device comprises TTL of the packet received by the layer-3 network device.

7. The method according to claim 6, wherein determining, by the control device, the transmission path of the packet according to multiple attributes of the packet when the multiple network devices receive the packet, and the attributes of the multiple network devices in the multiple entries comprises:
sorting, by the control device, the multiple entries according to the TTL of the packet and the time of arrival of the packet at the layer-2 network device; and
determining, by the control device, that the attributes of the multiple network devices in the sorted multiple entries are the transmission path of the packet.

8. The method according to claim 6, wherein the layer-3 network device is a gateway device of a 3-layer network in communication with a layer-2 network, wherein the method further comprises acquiring, by the control device, the layer-2 identifier of the packet, the layer-3 identifier of the packet, a mapping between the layer-2 identifier of the packet and the layer-3 identifier of the packet, and an Internet Protocol (IP) address of the gateway device that are sent by the gateway device, wherein, the multiple entries comprise entries that have a same value of the layer-2 identifier of the packet and entries that have a same value of the layer-3 identifier of the packet, and wherein the layer-2 identifier of the packet is mapped to the layer-3 identifier of the packet according to the mapping.

9. A layer-2 network device, comprising:
a memory storing executable instructions;
a processor coupled to the memory and configured to acquire a characteristic of a packet and an attribute of the packet according to the packet; and
a transmitter coupled to the processor and configured to send the characteristic of the packet and the attribute of the packet that are acquired, and an attribute of the layer-2 network device to a control device such that the control device determines a traversed transmission path of the packet according to the characteristic of the packet, the attribute of the packet, and the attribute of the layer-2 network device,
wherein the characteristic that is acquired and is of the packet comprises a layer-3 identifier of the packet or a layer-2 identifier of the packet, and wherein the attribute that is acquired and is of the packet comprises time to live (TTL) of the packet and time of arrival of the packet at the layer-2 network device.

10. A control device, comprising:
a memory storing executable instructions; and
a processor coupled to the memory and configured to:
acquire multiple entries that are sent by multiple network devices and are of a packet, wherein characteristics of the packet in the multiple entries are the same or the characteristics of the packet in the multiple entries are corresponding to each other, and each entry of the multiple entries comprises a characteristic of the packet, an attribute of the packet when a network device that sends the entry receives the packet, and an attribute of the network device that sends the entry; and
determine a traversed transmission path of the packet according to multiple attributes of the packet when the multiple network devices receive the packet, and attributes of the multiple network devices in the multiple entries,
wherein the multiple network devices comprise a layer-2 network device,
wherein a characteristic of the packet in an entry sent by the layer-2 network device comprises a layer-2 identifier of the packet or a layer-3 identifier of the packet, and wherein an attribute of the packet in the entry sent by the layer-2 network device comprises time to live (TTL) of the packet received by the layer-2 network device and time of arrival of the packet at the layer-2 network device.

11. The control device according to claim 10, wherein the multiple network devices further comprise a layer-3 network device, wherein a characteristic of the packet in an entry sent by the layer-3 network device comprises a layer-3 identifier of the packet, and wherein an attribute of the packet in the entry sent by the layer-3 network device comprises TTL of the packet received by the layer-3 network device.

12. The control device according to claim 11, wherein the processor is further configured to:

sort the multiple entries according to the TTL of the packet and the time of arrival of the packet at the layer-2 network device; and determine that the attributes of the multiple network devices in the sorted multiple entries are the traversed transmission path of the packet.

13. The control device according to claim 11, wherein the layer-3 network device is a gateway device of a 3-layer network in communication with a layer-2 network, and wherein the processor is further configured to acquire the layer-2 identifier of the packet, the layer-3 identifier of the packet, a mapping between the layer-2 identifier of the packet and the layer-3 identifier of the packet, and an Internet Protocol (IP) address of the gateway device that are sent by the gateway device, wherein the multiple entries comprise entries that have a same value of the layer-2 identifier of the packet and entries that have a same value of the layer-3 identifier of the packet, and wherein the layer-2 identifier of the packet is mapped to the layer-3 identifier of the packet according to the mapping.

* * * * *

UNITED STATES PATENT AND TRADEMARK OFFICE
CERTIFICATE OF CORRECTION

PATENT NO.         : 9,712,441 B2
APPLICATION NO.    : 14/743007
DATED              : July 18, 2017
INVENTOR(S)        : Ying Li and Zhengquan Huang Page 1 of 1

It is certified that error appears in the above-identified patent and that said Letters Patent is hereby corrected as shown below:

In the Claims

Column 35, Line 48, Claim 5 should read:
comprises time to live (TTL) of the packet received by Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*